US011373006B2

(12) United States Patent
Kurian et al.

(10) Patent No.: US 11,373,006 B2
(45) Date of Patent: *Jun. 28, 2022

(54) PROCESSING SYSTEM USING NATURAL LANGUAGE PROCESSING FOR PERFORMING DATASET FILTERING AND SANITIZATION

(71) Applicant: Bank of America Corporation, Charlotte, NC (US)

(72) Inventors: Manu Kurian, Dallas, TX (US); Shashikant Sadashiv Jadhav, Singapore (MY)

(73) Assignee: Bank of America Corporation, Charlotte, NC (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/983,082

(22) Filed: Aug. 3, 2020

(65) Prior Publication Data

US 2020/0364372 A1 Nov. 19, 2020

Related U.S. Application Data

(63) Continuation of application No. 15/992,456, filed on May 30, 2018, now Pat. No. 10,769,307.

(51) Int. Cl.
*G06F 21/62* (2013.01)
*H04L 9/40* (2022.01)
(Continued)

(52) U.S. Cl.
CPC ........ *G06F 21/6254* (2013.01); *G06F 40/295* (2020.01); *G06N 20/00* (2019.01); *H04L 63/0428* (2013.01); *H04L 63/102* (2013.01)

(58) Field of Classification Search
CPC ............. G06F 21/6218; G06F 21/6227; G06F 21/6245–6254; G06F 40/216;
(Continued)

(56) References Cited

U.S. PATENT DOCUMENTS 7,624,005 B2 11/2009 Koehn et al.
8,050,907 B2 11/2011 Baisley et al.
(Continued)

OTHER PUBLICATIONS

Mar. 6, 2020—(US) Office Action—U.S. Appl. No. 15/992,456.
Jun. 23, 2020—(US) Notice of Allowance—U.S. Appl. No. 15/992,456.

*Primary Examiner* — Kevin Bechtel
(74) *Attorney, Agent, or Firm* — Banner & Witcoff, Ltd.

(57) ABSTRACT

Aspects of the disclosure relate to processing systems using natural language processing with improved dataset filtering and sanitization techniques. A computing platform may receive a dataset file and commands directing the computing platform to sanitize the dataset file. In response to the commands, the computing platform may identify confidential information contained in the dataset file using named entity recognition and one or more dynamic entity profiles, extract the confidential information, and replace the confidential information with non-confidential information to produce a sanitized dataset file. Based on identifying the confidential information contained in the dataset file, the computing platform may update the dynamic entity profiles. The computing platform may send the sanitized dataset file to the target environment host server, causing the target environment host server to use the sanitized dataset file in a testing environment that is prohibited from containing confidential information.

20 Claims, 18 Drawing Sheets

(51) Int. Cl.
*G06N 20/00* (2019.01)
*G06F 40/295* (2020.01)

(58) Field of Classification Search
CPC ..... G06F 40/284; G06F 40/295; G06N 20/00; H04L 63/0428; H04L 63/102
See application file for complete search history.

(56) References Cited

U.S. PATENT DOCUMENTS

| | | | |
|---|---|---|---|
| 8,407,160 B2 | 3/2013 | Cretu et al. | |
| 8,706,451 B1 | 4/2014 | Gross et al. | |
| 8,938,386 B2 | 1/2015 | Cumby et al. | |
| 9,088,596 B2 | 7/2015 | Ciocarlie et al. | |
| 9,336,772 B1 | 5/2016 | Salvador et al. | |
| 9,418,059 B1 | 8/2016 | Singliar et al. | |
| 9,524,716 B2 | 12/2016 | Sethy et al. | |
| 9,536,522 B1 | 1/2017 | Hall et al. | |
| 9,558,176 B2 | 1/2017 | Tur et al. | |
| 9,779,085 B2 | 10/2017 | Wick et al. | |
| 9,805,028 B1 | 10/2017 | Sutskever et al. | |
| 9,953,332 B2 | 4/2018 | Bateman | |
| 9,953,370 B2 | 4/2018 | Pershing et al. | |
| 9,957,569 B2 | 5/2018 | Chinnaiyan et al. | |
| 9,957,781 B2 | 5/2018 | Vennelakanti et al. | |
| 9,959,636 B2 | 5/2018 | Imber et al. | |
| 9,962,090 B2 | 5/2018 | DiMaio et al. | |
| 9,963,747 B2 | 5/2018 | Bryant et al. | |
| 9,965,129 B2 | 5/2018 | Reiley et al. | |
| 9,965,514 B2 | 5/2018 | Crupi et al. | |
| 9,965,677 B2 | 5/2018 | Bulan et al. | |
| 9,965,705 B2 | 5/2018 | Chen et al. | |
| 9,965,865 B1 | 5/2018 | Agrawal et al. | |
| 9,971,831 B2 | 5/2018 | Chainani et al. | |
| 9,972,360 B2 | 5/2018 | Song et al. | |
| 9,976,188 B2 | 5/2018 | Stone et al. | |
| 9,977,140 B2 | 5/2018 | Wang et al. | |
| 9,977,656 B1 | 5/2018 | Mannopantar et al. | |
| 9,977,962 B2 | 5/2018 | Klein et al. | |
| 9,978,159 B2 | 5/2018 | Kraus et al. | |
| 9,978,270 B2 | 5/2018 | Raamot | |
| 9,978,288 B2 | 5/2018 | Lok et al. | |
| 9,978,362 B2 | 5/2018 | Dolan et al. | |
| 9,983,215 B2 | 5/2018 | Speicher et al. | |
| 9,983,763 B2 | 5/2018 | Hilton et al. | |
| 9,983,978 B1 | 5/2018 | Mola et al. | |
| 9,984,128 B2 | 5/2018 | Vasan et al. | |
| 9,984,129 B2 | 5/2018 | Patel et al. | |
| 9,984,170 B2 | 5/2018 | Evans et al. | |
| 9,984,198 B2 | 5/2018 | Deciu et al. | |
| 9,984,277 B2 | 5/2018 | Castro-Gonzalez et al. | |
| 10,275,396 B1 | 4/2019 | Hart | |
| 2013/0262399 A1* | 10/2013 | Eker | G06F 16/213 707/687 |
| 2013/0318348 A1* | 11/2013 | Lebron | H04L 63/0428 713/168 |
| 2016/0014110 A1 | 1/2016 | Kurspahic | |
| 2019/0213101 A1* | 7/2019 | Raviv | G06F 21/57 |

\* cited by examiner

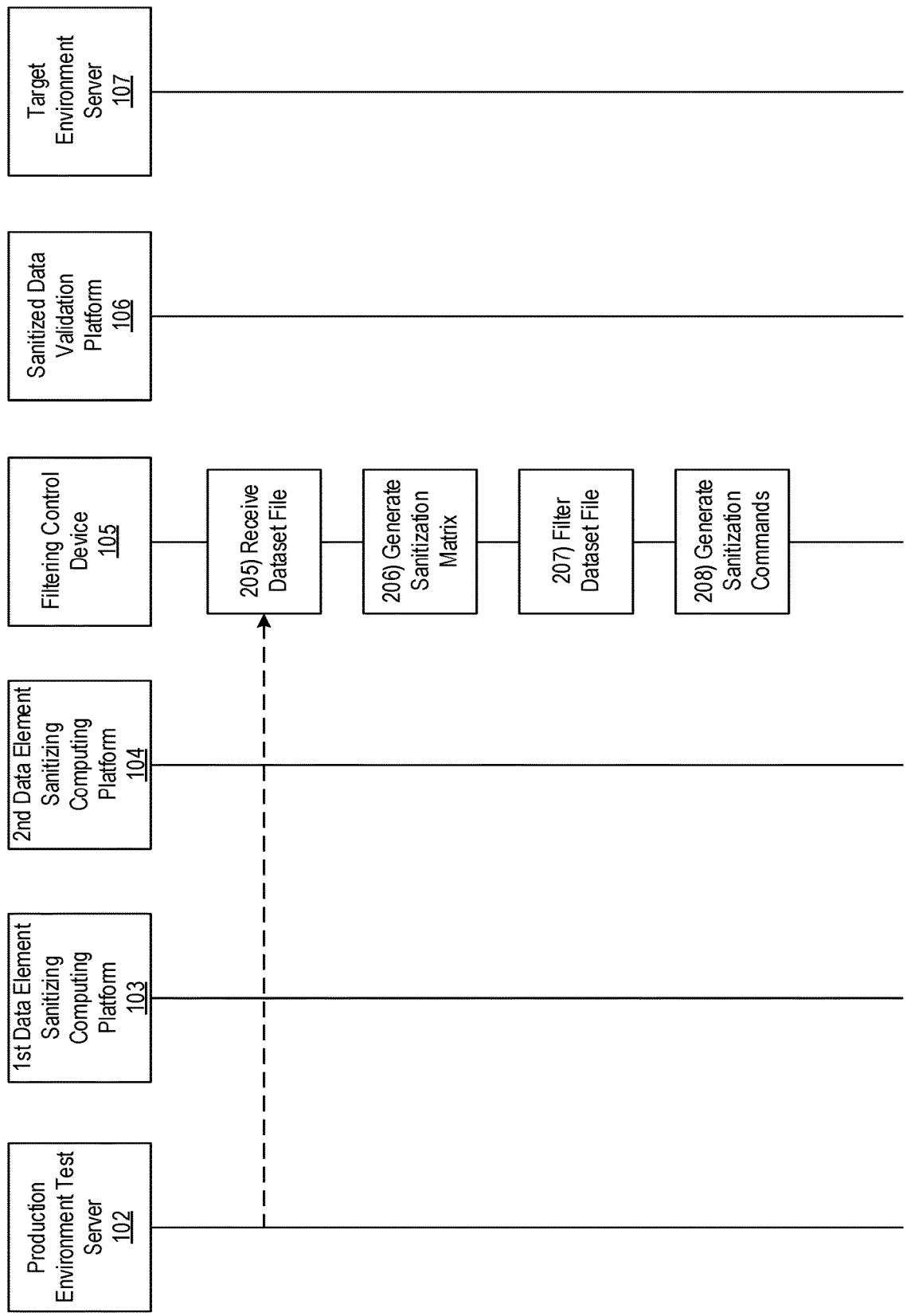

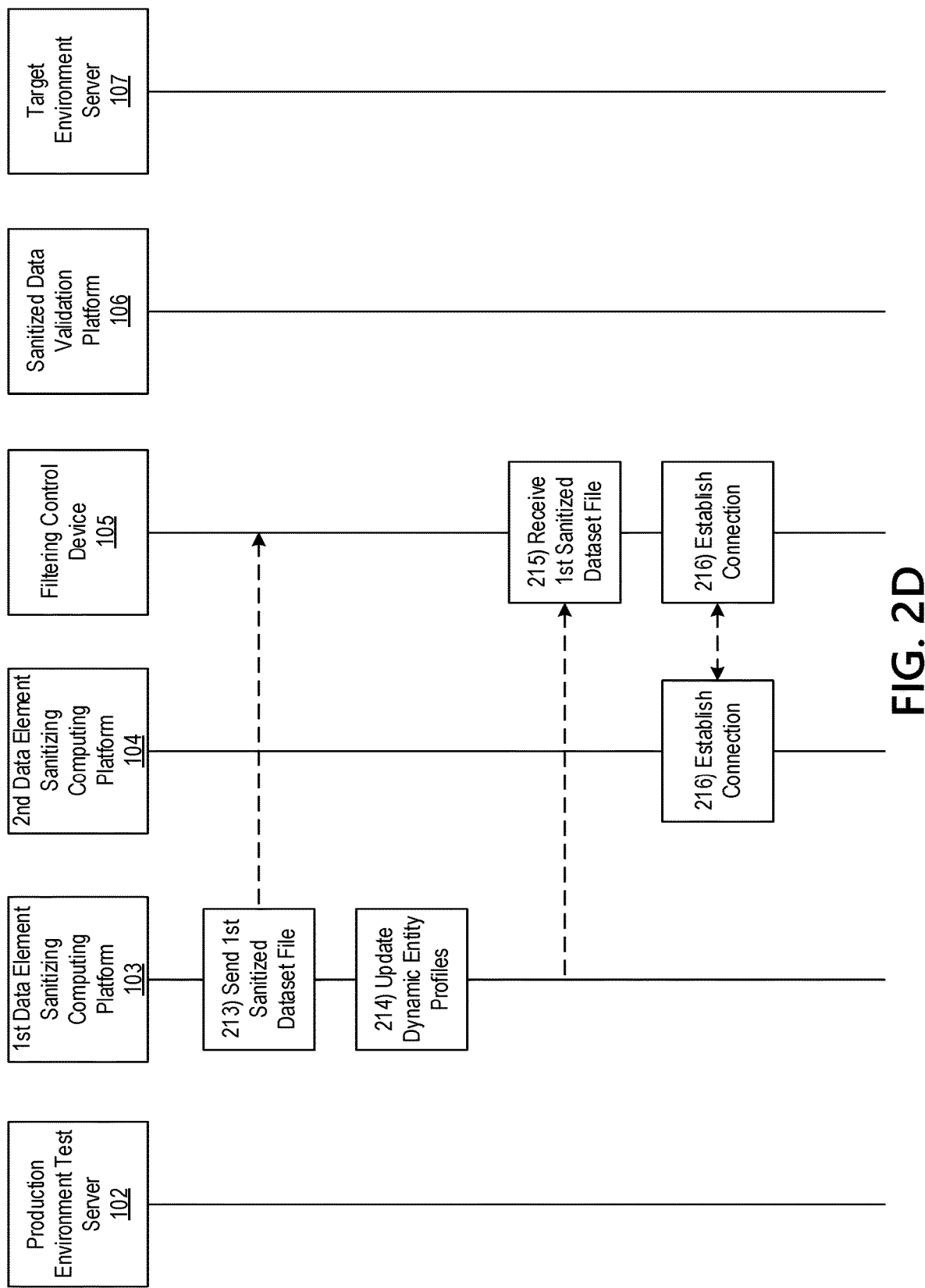

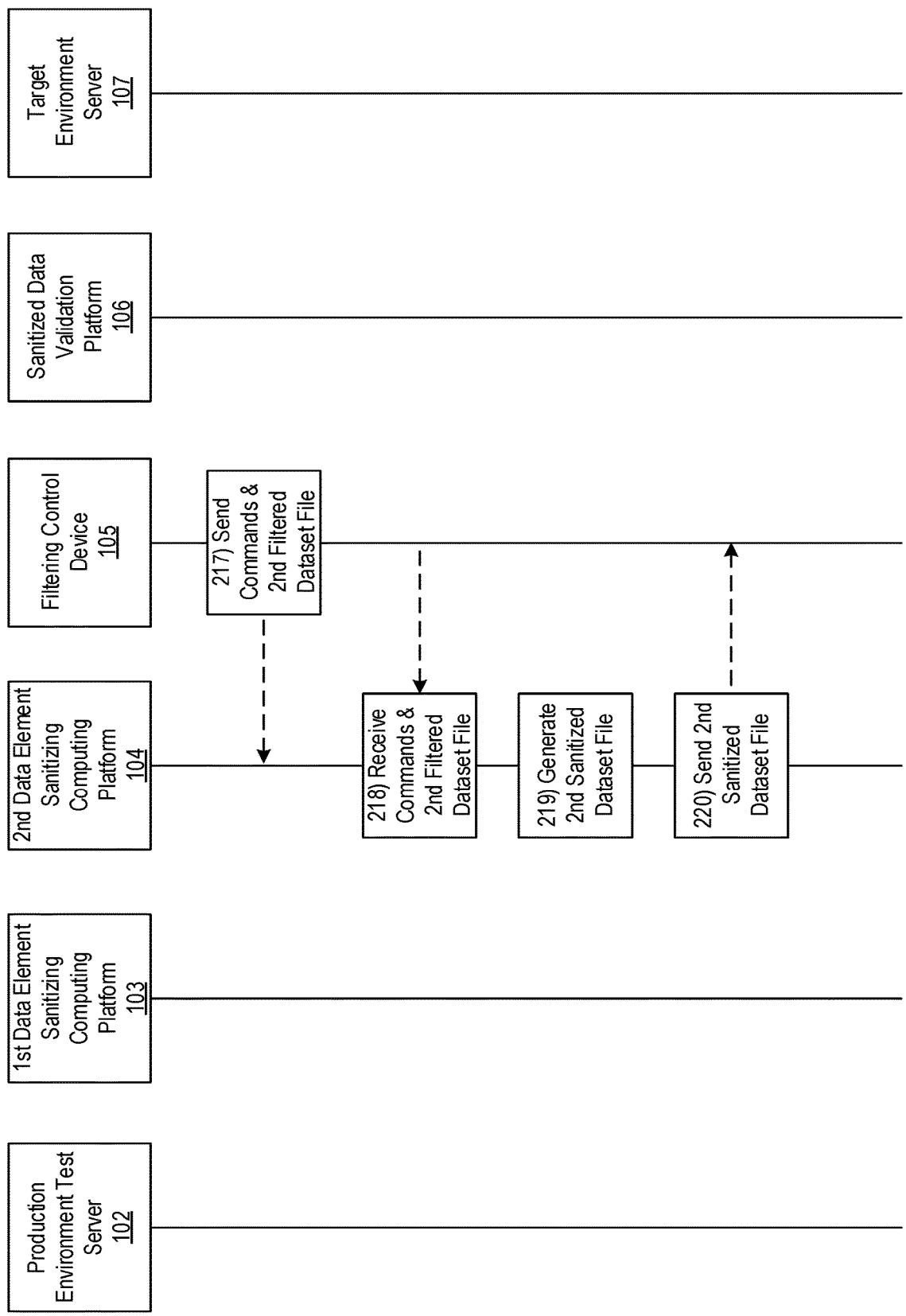

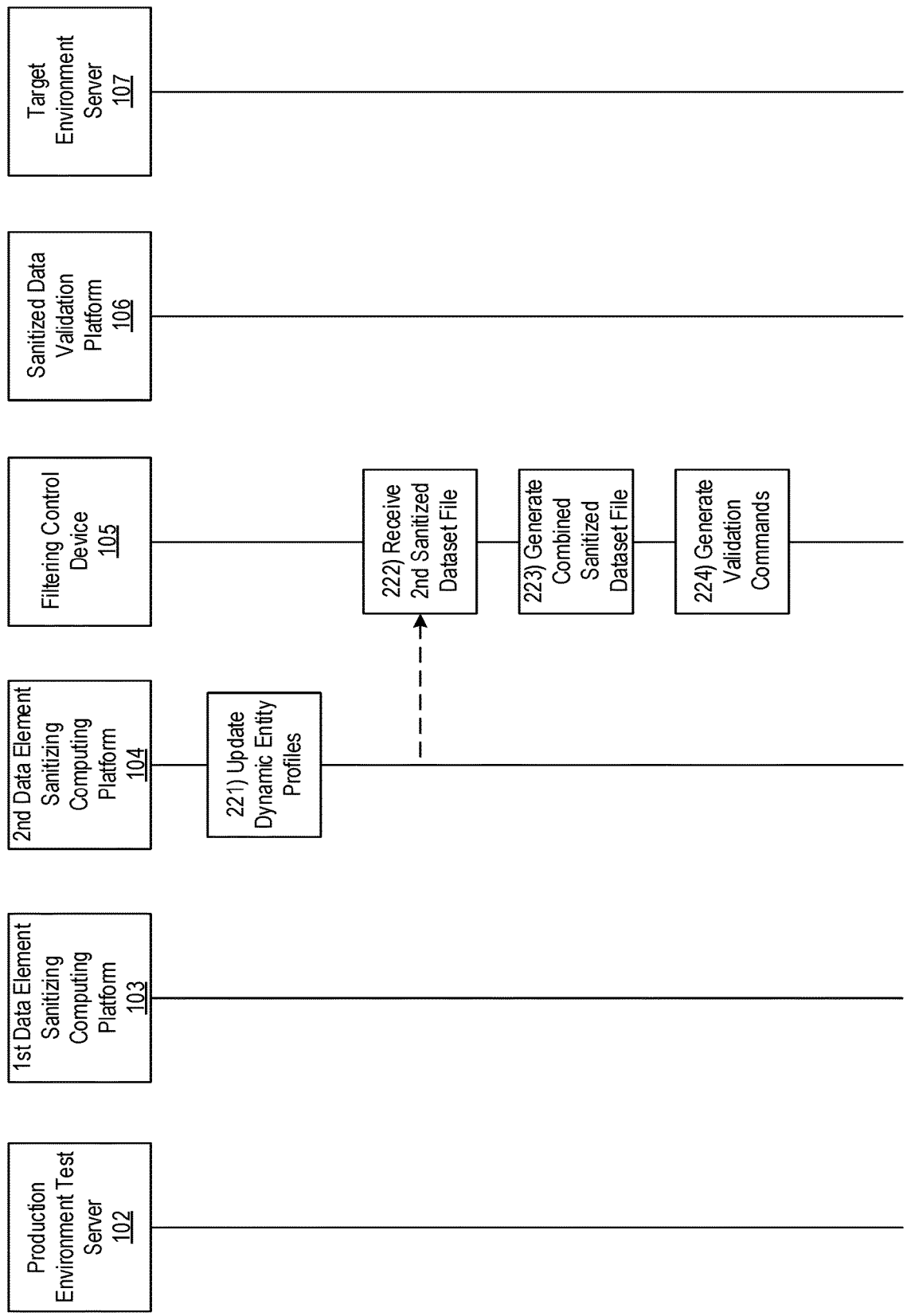

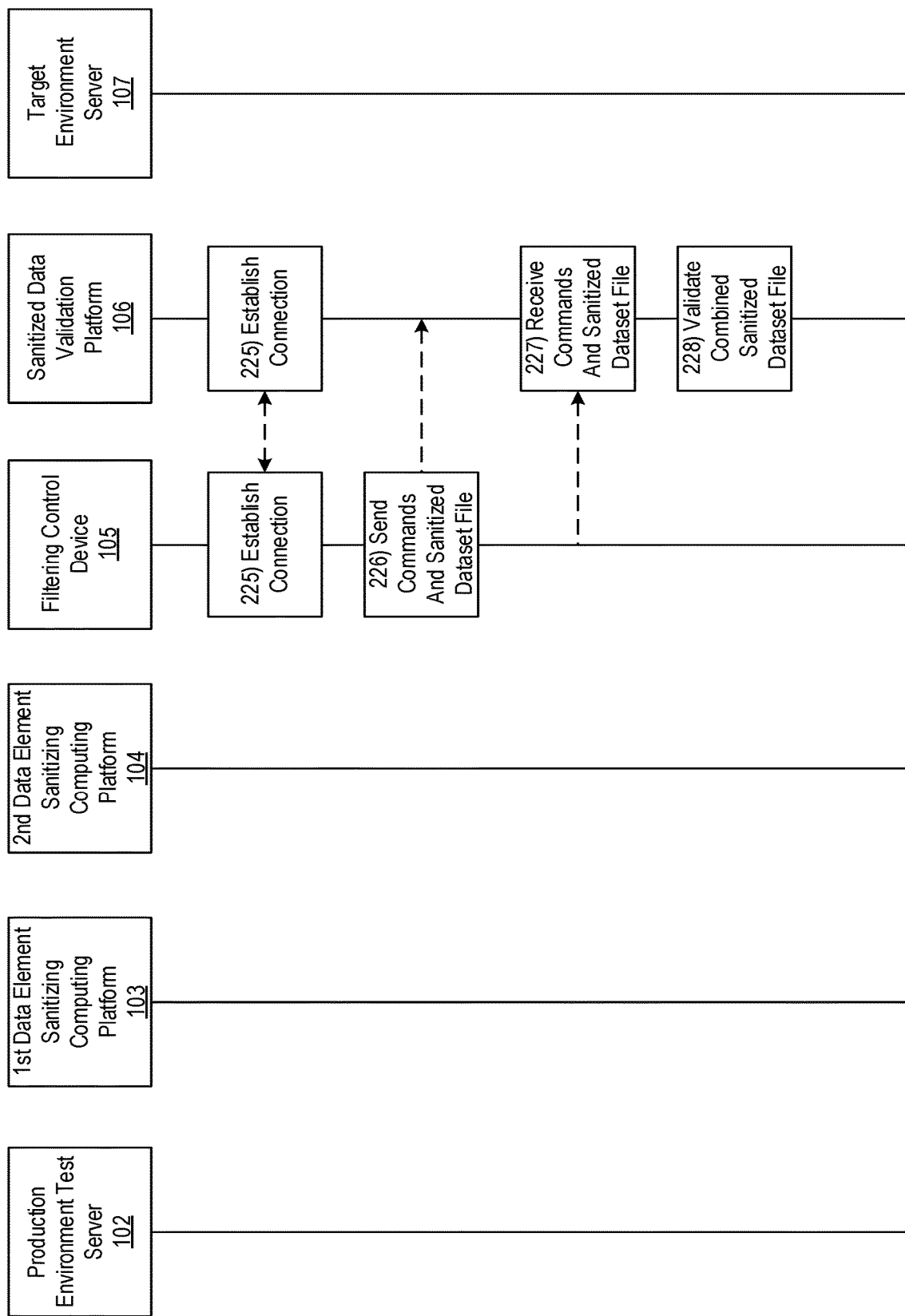

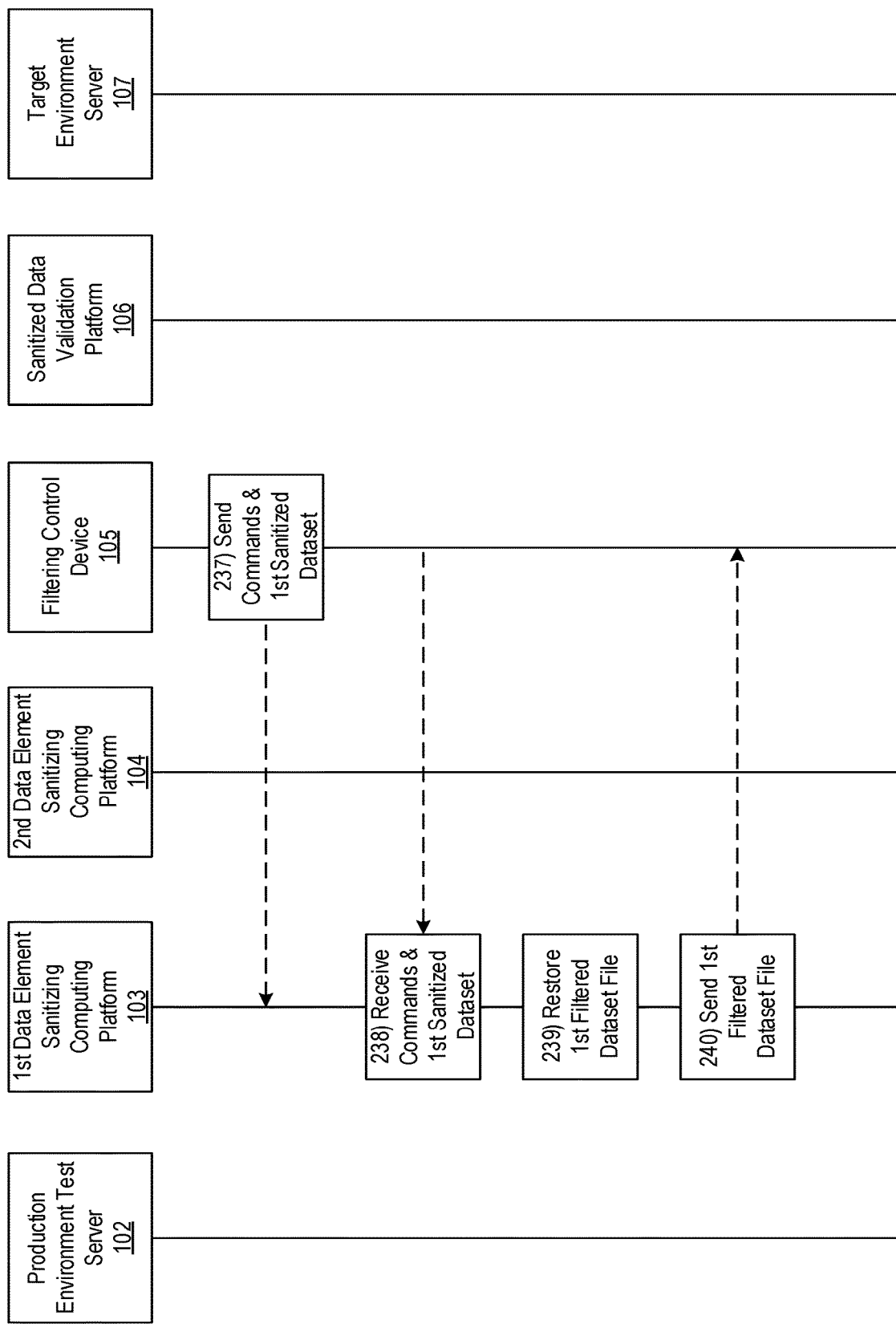

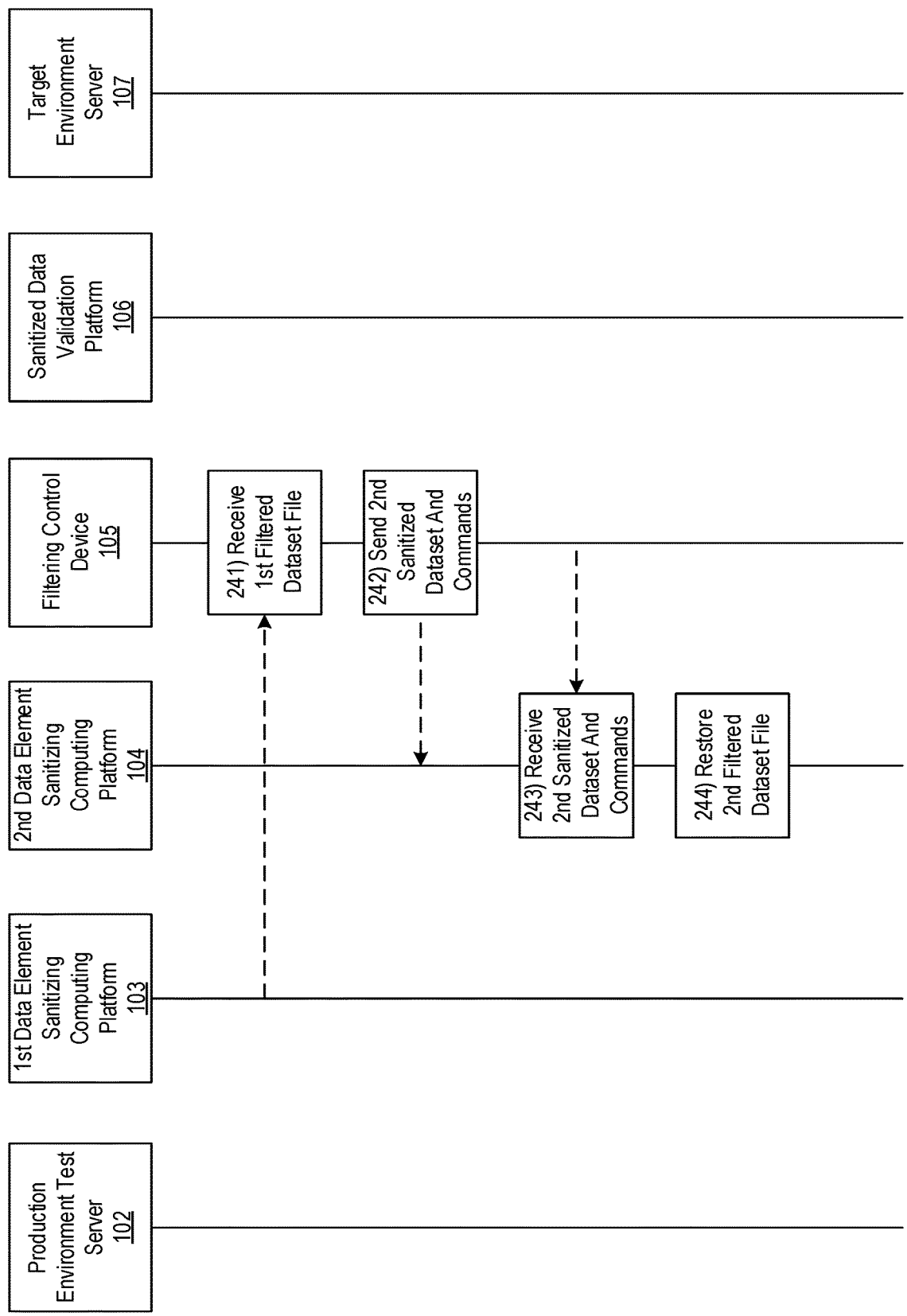

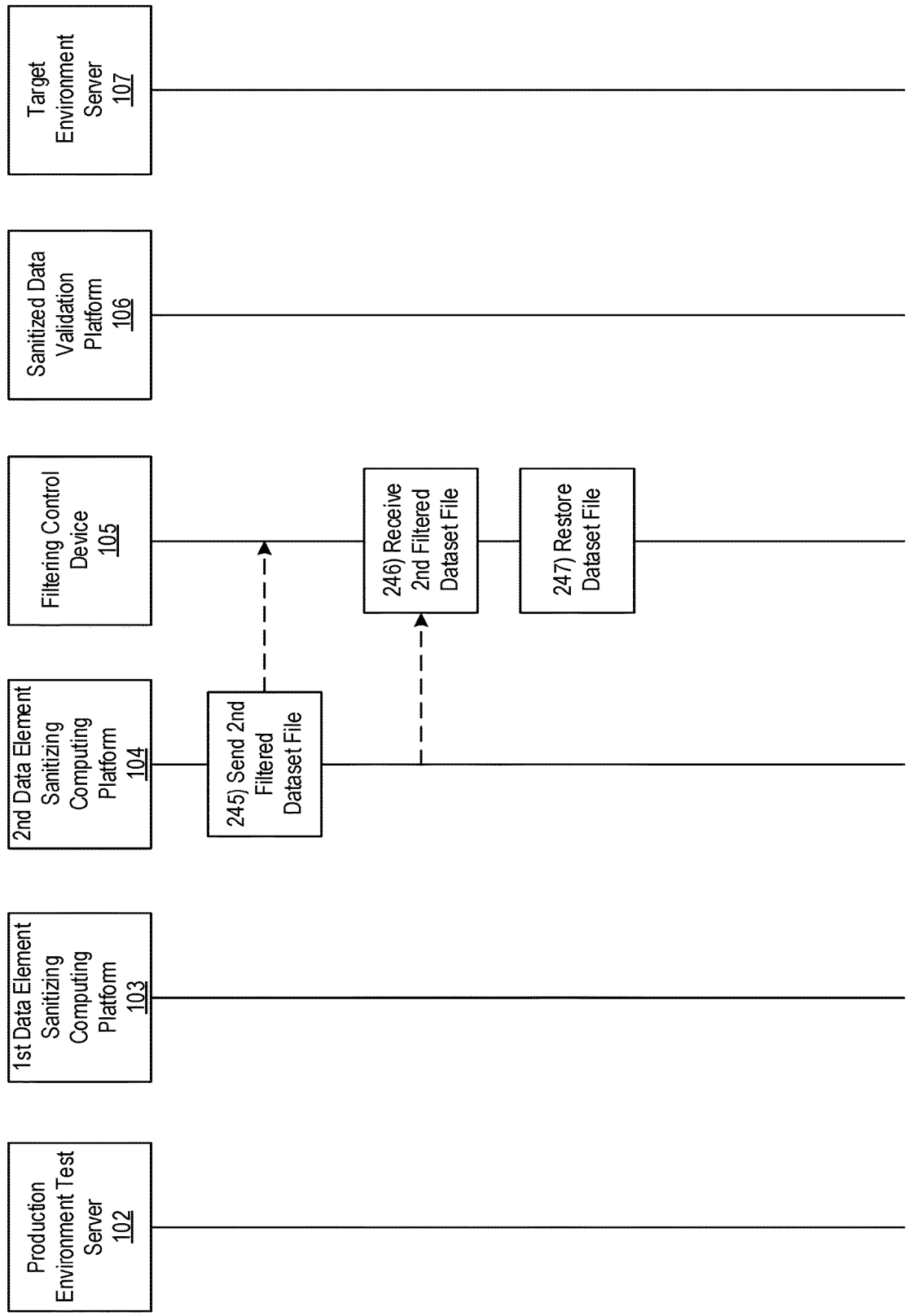

305

Production Environment Test Server Interface

1, BOFA_XXXXXX, SBIN_YYYYY, N, XXX, XXX, XXX, RCUR, MNTH, YYYYYY, ZZZZZZ, First M. Last, Location, XXXZZZ, Saving

Target Environment Server Interface

1, BOFA_XXXXXX, SBIN_YYYYY, N, XXX, XXX, XXX, RCUR, MNTH, YYYYYY, ZZZZZZ, ALPHA-NUMKEY1, ALPHA-NUMKEY2, ALPHA-NUMKEY3, Saving

FIG. 4

PROCESSING SYSTEM USING NATURAL LANGUAGE PROCESSING FOR PERFORMING DATASET FILTERING AND SANITIZATION

CROSS-REFERENCE TO RELATED APPLICATIONS

The present application is a continuation of U.S. application Ser. No. 15/992,456, filed May 30, 2018, and entitled "Processing System For Providing a Teller Assistant Experience Using Enhanced Reality Interfaces," which is hereby incorporated by reference in its entirety.

BACKGROUND

Aspects of the disclosure relate to enhancing processing systems for performing dataset filtering and sanitization. In particular, one or more aspects of the disclosure relate to data element sanitizing computing platforms that use natural language processing to sanitize dataset files. One or more aspects of the disclosure also relate to filtering control devices that use advanced filtering techniques to filter and recombine dataset files before and after sanitization.

Many organizations and individuals rely on electronic records as a means for maintaining confidential information. Periodically, the computer systems that maintain such electronic records may need to be updated and/or tested. It may be important to ensure both ensure data security and optimize for efficiency and effectiveness when updating systems and/or applications and/or when performing system migration. In many instances, however, it may be difficult to optimize for efficiency and effectiveness when updating systems and/or applications while also ensuring utmost data security.

SUMMARY

Aspects of the disclosure provide effective, efficient, scalable, and convenient technical solutions that address and overcome the technical problems associated with optimizing the performance of and ensuring the efficiency of predictive error resolution and dynamic system configuration control computer systems. For example, some aspects of the disclosure provide techniques that may enable computing platforms to selectively remove confidential information from electronic records in an efficient and effective manner for purposes of testing new applications and system updates prior to implementation.

In accordance with an embodiment of the disclosure, a computing platform comprising at least one processor, a communication interface, and memory storing computing readable instructions may receive, from a filtering control device, a dataset file and one or more commands directing the computing platform to sanitize the dataset file. In response to receiving the one or more commands directing the computing platform to sanitize the dataset file, the computing platform may identify confidential information contained in the dataset file using named entity recognition and one or more dynamic entity profiles. The computing platform may sanitize the dataset file by extracting the confidential information from the dataset file and replacing the confidential information with non-confidential information to produce a sanitized dataset file. Based on identifying the confidential information contained in the dataset file, the computing platform may update the one or more dynamic entity profiles. The computing platform may send, to a target environment host server, the sanitized dataset file, and sending the sanitized dataset file to the target environment host server may cause the target environment host server to use the sanitized dataset file in a testing environment that is prohibited from containing confidential information.

In some embodiments, the computing platform may determine, for each data value included in the dataset file, at least one of a character count and a proximity to another data value. The computing platform may also determine, using at least one machine learning algorithm and at least one machine learning dataset, a dynamic entity profile corresponding to each of the data values included in the dataset file.

In some embodiments, the computing platform may determine the dynamic entity profile corresponding to each of the data values included in the dataset file by determining one or more of a customer name, an organization name, a location, an address, a currency, an amount, an account number, a phone number, a SWIFT code, or an email identification.

In some embodiments, the computing platform may determine, using one or more additional machine learning algorithms and one or more additional machine learning datasets, that one or more of the data values included in the dataset file corresponds to a dynamic entity profile corresponding to confidential information.

In some embodiments, the computing platform may determine that characteristics corresponding to one or more dynamic entity profiles should be updated.

In some embodiments, the computing platform may determine that the one or more commands directing the computing platform to sanitize the dataset file are directing the computing platform to determine whether the dataset file contains a first type of confidential information and that a second computing platform will subsequently be directed to determine whether the dataset file contains a second type of confidential information.

In some embodiments, the computing platform may sanitize the dataset file by extracting the confidential information from the dataset file that corresponds to the first type of confidential information.

In some embodiments, the computing platform may determine that the dataset file, received from the filtering control device, should be sent to a second computing platform to extract the confidential information from the dataset file that corresponds to a second type of confidential information. The computing platform may establish, with the second computing platform, a wireless data connection. The computing platform may send, via the wireless data connection and to the second computing platform, the dataset file.

In some embodiments, the computing platform may determine, after sending the sanitized dataset file to the target environment host server, that the sanitized dataset file should be restored to the dataset file, and restoring the dataset file may include extracting the non-confidential information and replacing the non-confidential information with the confidential information. Based on determining that the sanitized dataset file should be restored to the dataset file, the computing platform may restore the sanitized dataset file to the dataset file.

In some embodiments, the computing platform may receive the dataset file by receiving a file containing confidential information corresponding to one or more users.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for deploying an enhanced processing system that utilizes improved dataset filtering and sanitization techniques in accordance with one or more example embodiments;

FIGS. 3 and 4 depict example graphical user interfaces for deploying an enhanced processing system that utilizes improved dataset filtering and sanitization techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
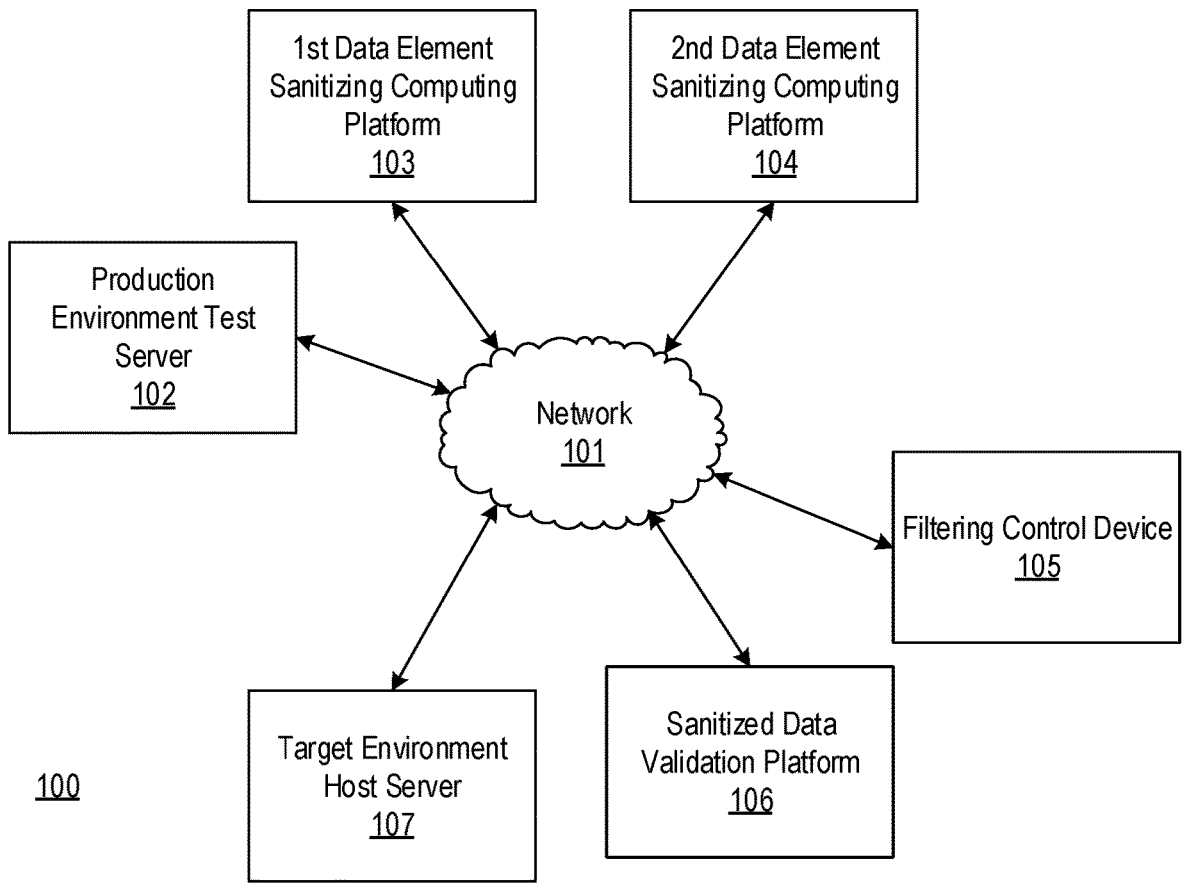
FIGS. 1A-1C depict an illustrative computing environment for deploying an enhanced processing system that utilizes improved dataset filtering and sanitization techniques in accordance with one or more example embodiments.
Figure 1B:
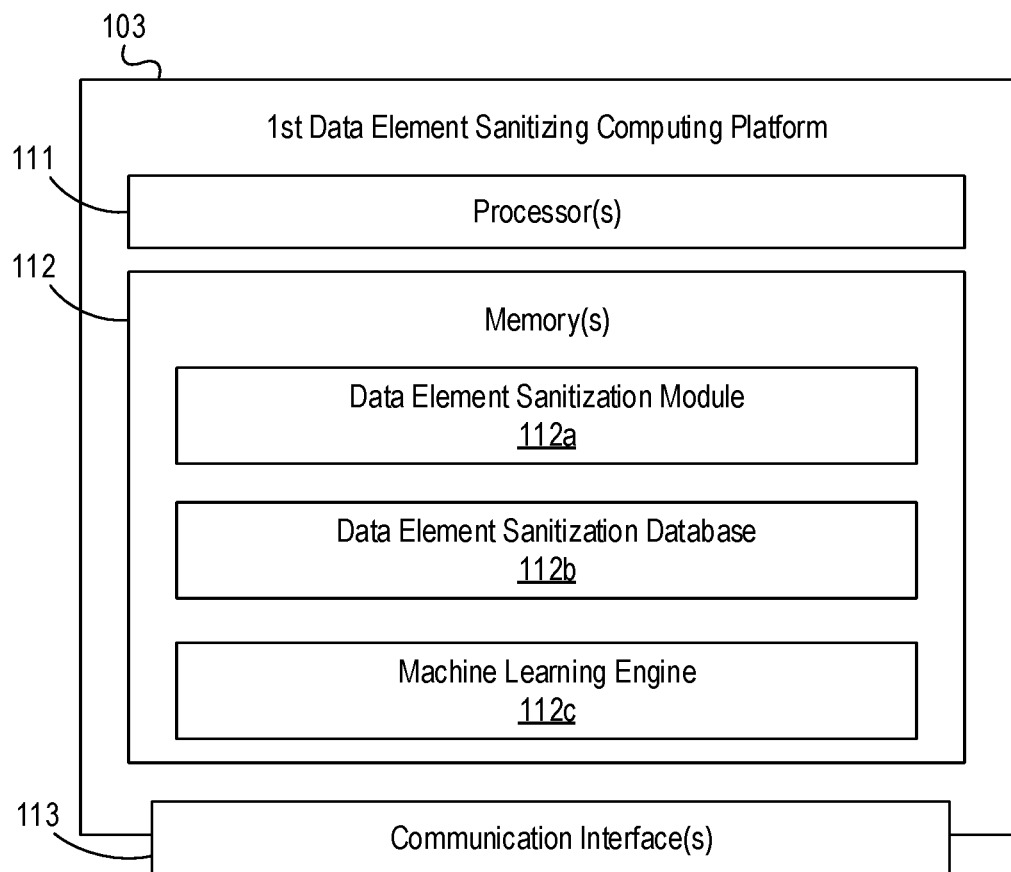
Figure 1C:
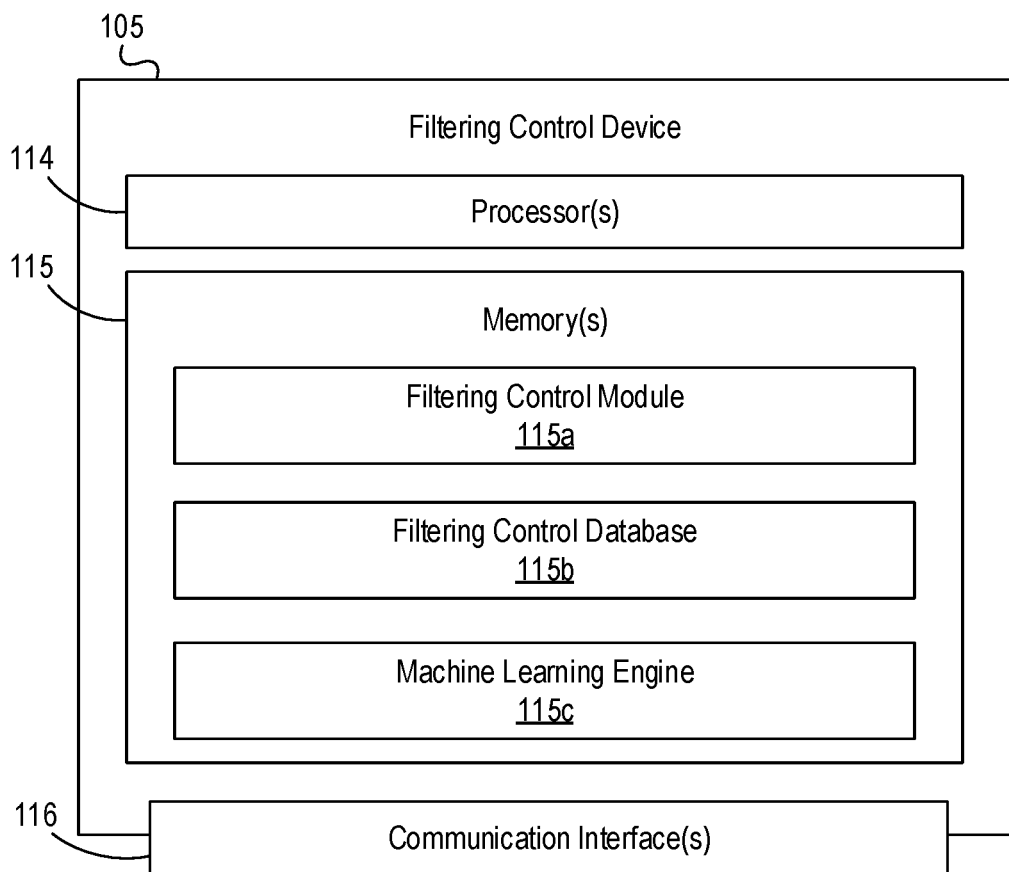

FIGS. 1A-1C depict an illustrative computing environment for deploying a processing system using natural language processing for performing improved dataset filtering and sanitization in accordance with one or more example embodiments. Referring to FIG. 1A, computing environment 100 may include one or more computer systems. For example, computing environment 100 may include a production environment test server 102, a first data element sanitizing computing platform 103, a second data element sanitizing computing platform 104, a filtering control device 105, a sanitized data validation platform 106, and a target environment host server 107.

Production environment test server 102 may be a computer system that includes one or more computing devices and/or other computer components (e.g., processors, memories, communication interfaces). In addition, production environment test server 102 may be configured to receive requests (e.g., requests to manage information corresponding to secure customer accounts for various institutions such as financial account data for a financial institution, and the like.) In some instances, production environment test server 102 may migrate from old applications to new applications as part of various system upgrades.

In addition, and as illustrated in greater detail below, production environment test server 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by production environment test server 102 may be associated with an internal portal provided by an organization, such a database for confidential information corresponding to customers and their accounts. Such a portal may, for instance, provide employees of a financial institution with access to confidential information (which may, e.g., be limited and/or controlled by the portal based on each individual employee's position, role(s), and/or function(s)) and/or may provide employees of the financial institution with menus, controls, and/or other options to execute various actions with regard to customer accounts.

As illustrated in greater detail below, first data element sanitizing computing platform 103 may include one or more computing devices configured to perform one or more of the functions described herein. For example, first data element sanitizing computing platform 103 may include one or more computers (e.g., laptop computers, desktop computers, servers, server blades, or the like).

As illustrated in greater detail below, second data element sanitizing computing platform 104 may include one or more computing devices configured to perform one or more of the functions described herein. For example, second data element sanitizing computing platform 104 may include one or more computers (e.g., laptop computers, desktop computers, servers, server blades, or the like). Second data element sanitizing computing platform may be similar to the first data element sanitizing computing platform 103, described above.

As illustrated in greater detail below, filtering control device 105 may include one or more computing devices configured to perform one or more of the functions described herein. For example, filtering control device 105 may include one or more computers (e.g., laptop computers, desktop computers, servers, server blades, or the like).

Sanitized data validation platform 106 may be a computer system that includes one or more computing devices and/or other computer components (e.g., processors, memories, communication interfaces). In addition, sanitized data validation platform 106 may be configured to receive requests (e.g., requests to validate sanitized datasets from a data element sanitizing computing platform, such as first data element sanitizing computing platform 103 or second data element sanitizing computing platform 104, or a filtering control device, such as filtering control device 105, and the like.)

Target environment host server 107 may include one or more computing devices and/or other computer components (e.g., processors, memories, communication interfaces). In addition, and as illustrated in greater detail below, target environment host server 107 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by target environment host server 107 may be associated with an internal portal provided by an organization, such as testing environment for applications that is prohibited from containing confidential information. Such a portal may, for instance, provide employees of a financial institution with access to a testing environment for simulation of application updates and/or may provide employees of the financial institution with menus, controls, and/or other options to execute various testing actions.

Computing environment 100 also may include one or more networks, which may interconnect production environment test server 102, first data element sanitizing computing platform 103, second data element sanitizing computing platform 104, filtering control device 105, sanitized data validation platform 106, and target environment host server 107. For example, computing environment 100 may include a network 101 (which may interconnect, e.g., production environment test server 102, first data element sanitizing computing platform 103, second data element sanitizing computing platform 104, filtering control device 105, sanitized data validation platform 106, and target environment host server 107).

In one or more arrangements, production environment test server 102, first data element sanitizing computing platform 103, second data element sanitizing computing platform 104, filtering control device 105, sanitized data validation platform 106, and target environment host server 107, and/or the other systems included in computing environment 100 may be any type of computing device capable of receiving a user interface, receiving input via the user interface, and communicating the received input to one or more other computing devices. For example, production environment test server 102, first data element sanitizing computing platform 103, second data element sanitizing computing platform 104, filtering control device 105, sanitized data validation platform 106, and target environment host server 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of production environment test server 102, first data element sanitizing computing platform 103, second data element sanitizing computing platform 104, filtering control device 105, sanitized data validation platform 106, and target environment host server 107 may, in some instances, be special-purpose computing devices configured to perform specific functions.

Referring to FIG. 1B, first data element sanitizing computing platform 103 may include one or more processors 111, memory 112, and communication interface 113. A data bus may interconnect processor 111, memory 112, and communication interface 113.

Communication interface 113 may be a network interface configured to support communication between first data element sanitizing computing platform 103 and one or more networks (e.g., network 101, or the like). Memory 112 may include one or more program modules having instructions that when executed by processor 111 cause first data element sanitizing computing platform 103 to perform one or more functions described herein and/or one or more databases that may store and/or otherwise maintain information which may be used by such program modules and/or processor 111. In some instances, the one or more program modules and/or databases may be stored by and/or maintained in different memory units of first data element sanitizing computing platform 103 and/or by different computing devices that may form and/or otherwise make up first data element sanitizing computing platform 103. For example, memory 112 may have, store, and/or include a data element sanitization module 112a, a data element sanitization database 112b, and a machine learning engine 112c. Data element sanitization module 112a may have instructions that direct and/or cause first data element sanitizing computing platform 103 to execute advanced data element sanitization techniques, as discussed in greater detail below. Data element sanitization database 112b may store information used by data element sanitization module 112a and/or first data element sanitizing computing platform 103 in data element sanitization and/or in performing other functions. Machine learning engine 112c may have instructions that direct and/or cause the first data element sanitizing computing platform 103 to perform data element sanitization and to set, define, and/or iteratively refine optimization rules and/or other parameters used by the first data element sanitizing computing platform 103 and/or other systems in computing environment 100.

Second data element sanitizing computing platform 104 may be similar to first data element sanitizing computing platform 103 as described above. For example, second data element sanitizing computing platform 104 may include similar components, as well as similar program modules, which may execute similar functions.

Referring to FIG. 1C, filtering control device 105 may include one or more processors 114, memory 115, and communication interface 116. A data bus may interconnect processor 114, memory 115, and communication interface 116. Communication interface 116 may be a network interface configured to support communication between filtering control device 105 and one or more networks (e.g., network 101, or the like). Memory 115 may include one or more program modules having instructions that when executed by processor 114 cause filtering control device 105 to perform one or more functions described herein and/or one or more databases that may store and/or otherwise maintain information which may be used by such program modules and/or processor 114. In some instances, the one or more program modules and/or databases may be stored by and/or maintained in different memory units of filtering control device 105 and/or by different computing devices that may form and/or otherwise make up filtering control device 105. For example, memory 115 may have, store, and/or include a filtering control module 115a, a filtering control database 115b, and a machine learning engine 115c. Filtering control module 115a may have instructions that direct and/or filtering control device 105 to execute advanced filtering control techniques, as discussed in greater detail below. Filtering control database 115b may store information used by filtering control module 115a and/or filtering control device 105 in filtering control and/or in performing other functions. Machine learning engine 115c may have instructions that direct and/or cause the filtering control device 105 to perform filtering control and to set, define, and/or iteratively refine optimization rules and/or other parameters used by the filtering control device 105 and/or other systems in computing environment 100.

Figure 2A:
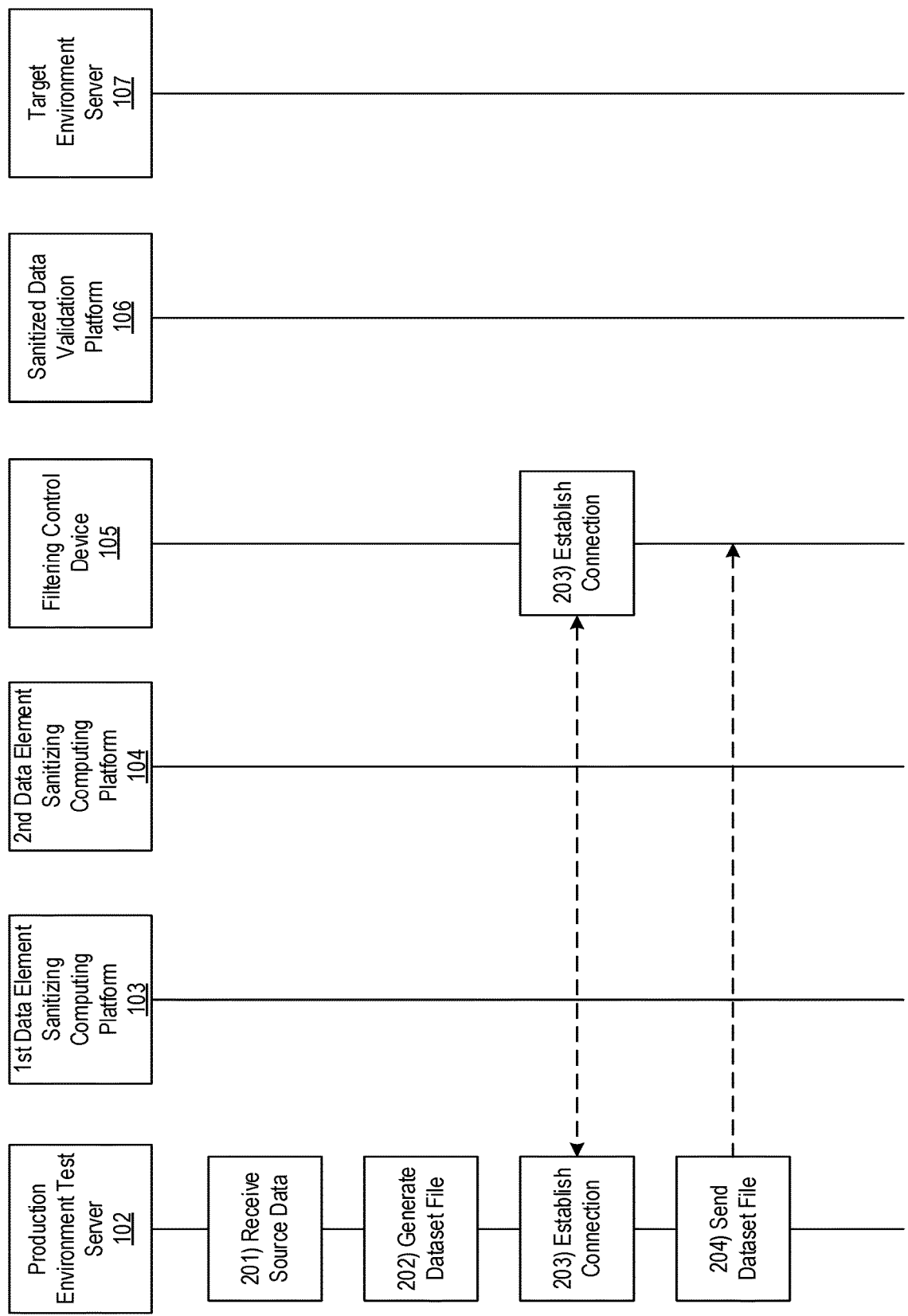

FIGS. 2A-2L depict an illustrative event sequence for deploying a processing system for dataset filtering and sanitization that utilizes improved natural language processing and filtering techniques in accordance with one or more example embodiments. Referring to FIG. 2A, at step 201, production environment test server 102 may receive source data. In receiving the source data, the production environment test server 102 may receive data corresponding to various customer accounts, such as checking or savings accounts managed by a financial institution, or transactions between customers using one or more financial institutions. For example, the production environment test server 102 may receive serial numbers, utility codes, destination banks, magnetic ink character recognition (MICR) data, amounts, consumer reference numbers, scheme reference numbers, frequencies, frequency codes, names, customer details, account numbers, account types, telephone numbers, emails, category codes, and the like. In some examples, after receiving the source data, the production environment test server 102 may store the source data in a local memory. In some instances, the production environment test server 102 may receive the source data from various computing devices corresponding to customers and/or financial institutions (e.g., laptop computers, desktop computers, servers, server blades, mobile devices, or the like).

At step 202, the production environment test server 102 may generate a dataset file. For example, the production environment test server 102 may generate the dataset file using the source data received at step 201. In generating the dataset file, the production environment test server 102 may generate a discrete dataset that includes both confidential and non-confidential data corresponding to payments, accounts, customers, and the like.

In some examples, in causing display of the dataset file, the production environment test server 102 may cause display of a graphical user interface similar to graphical user interface 305, which is illustrated in FIG. 3. As seen in FIG. 3, graphical user interface 305 may include confidential data, such as a customer name, an organization name, a location, an address, a currency, an amount, an account number, a phone number, an email address, and the like. Graphical user interface 305 may also cause display of non-confidential information such as a date, an account type, and the like. In some instances, graphical user interface 305 may also display other confidential and non-confidential information not shown in FIG. 3 or described above.

At step 203, the production environment test server 102 may establish a connection to filtering control device 105. For example, the production environment test server 102 may establish a first wireless data connection to filtering control device 105 to link the filtering control device 105 to the production environment test server 102.

At step 204, the production environment test server 102 may send, to the filtering control device 105, the dataset file generated at step 203. For example, the production environment test server 102 may send, while the first wireless data connection is established, the dataset file. In some examples, the production environment test server 102 may receive a legacy application modernization indication indicating that a legacy application, currently running on the production environment test server 102, will be upgraded to a new application. In these examples, the production environment test server 102 may send the dataset file to the filtering control device 105 in response to the legacy application modernization indication.

In some examples, rather than sending the dataset file to the filtering control device 105, the production environment test server may establish a connection with a data element sanitizing computing platform, such as first data element sanitizing computing platform 103, second data element sanitizing computing platform 104, and the like, and may send the dataset file to the data element sanitizing computing platform without involving the filtering control device 105. In these examples, the production environment test server 102 may determine that the dataset file may be sanitized by a single data element sanitizing computing platform (e.g., first data element sanitizing computing platform 103, second data element sanitizing computing platform 104, and the like).

Referring to FIG. 2B, at step 205, the filtering control device 105 may receive the dataset file from the production environment test server 102. For example, the filtering control device 105 may receive, while the first wireless data connection is established and via the communication interface 116, the dataset file.

At step 206, the filtering control device 105 may generate a sanitization matrix. In generating the sanitization matrix, the filtering control device 105 may generate a correlation matrix between portions of the dataset file and a data element sanitizing computing platform responsible for sanitizing each of the portions. For example, the filtering control device 105 may determine that first data element sanitizing computing platform 103 is responsible for filtering out confidential information corresponding to a particular dynamic entity profile. As an example, the filtering control device 105 may determine that first data element sanitizing computing platform 103 is responsible for filtering out confidential information corresponding to one or more of: customer names, organization names, locations, addresses, currency types, amounts, account numbers, phone numbers, SWIFT codes, email addresses, and the like. The filtering control device 105 may also determine that second data element sanitizing computing platform 104 is responsible for filtering out a remainder of confidential information not filtered out by the first data element sanitizing computing platform 103. In generating the sanitization matrix, the filtering control device 105 may generate, for example, a spreadsheet listing the correlations between data element sanitizing computing platforms and dynamic entity profiles. Although two data element sanitizing computing platforms are discussed with regard to step 206, in other instances, any number of data element sanitizing computing platforms may be implemented.

At step 207, the filtering control device 105 may filter the dataset file. For example, using the sanitization matrix, the filtering control device 105 may filter the dataset file into multiple filtered dataset files (e.g., a first filtered dataset file, a second filtered dataset file, and the like), each corresponding to one or more dynamic entity profiles. In this example, the filtering control device 105 may determine that the dataset file contains customer names, contact information, and account numbers, along with non-confidential information. The filtering control device 105 may look each of these dynamic entity profiles up in the sanitization matrix to determine corresponding data element sanitizing computing platforms. The filtering control device 105 may determine that a first data element sanitizing computing platform (e.g., first data element sanitizing computing platform 103) is responsible for removing customer names from dataset files, and that a second data element sanitizing computing platform (e.g., second data element sanitizing computing platform 104) is responsible for removing contact information and account numbers from dataset files. In this example, the filtering control device 105 may filter the dataset file into a first filtered dataset file containing the customer names and non-confidential information and a second filtered dataset file containing the account numbers and contact information along with the non-confidential information.

At step 208, the filtering control device 105 may generate one or more sanitization commands directing various data element sanitizing computing platforms to sanitize their respective filtered dataset files. In generating the one or more sanitization commands directing the various data element sanitizing computing platforms to sanitize their respective filtered dataset files, the filtering control device 105 may generate one or more commands directing the various data element sanitizing computing platforms to perform named entity recognition to identify named entities corresponding to dynamic entity profiles in the filtered dataset files that correspond to confidential information, extract the confidential information corresponding to those dynamic entity profiles, and replace with confidential information with non-confidential information. For example, the filtering control device 105 may generate one or more sanitization commands directing the first data element sanitizing computing platform 103 to perform natural language processing on the first filtered dataset file to identify customer names included in the first filtered dataset file, to extract the customer names, and to replace the customer names with non-confidential information, such as a random numeric value or alpha-numeric key. The filtering control device 105 may also generate one or more sanitization commands directing the second data element sanitizing computing platform 104 to identify contact information and account numbers included in the second filtered dataset file using natural language processing, to extract the contact information and account numbers, and to replace the contact information and the account numbers with non-confidential information, such as a random numeric value or alpha-numeric key. Although customer names, account numbers, and contact information are described with regard to the sanitization commands, in some instances, at step 208, the filtering control device 105 may generate one or more sanitization commands directing any number of data element sanitizing computing platforms to identify, extract, and replace data corresponding to any of the dynamic entity profiles described above with regard to step 206.

Figure 2C:
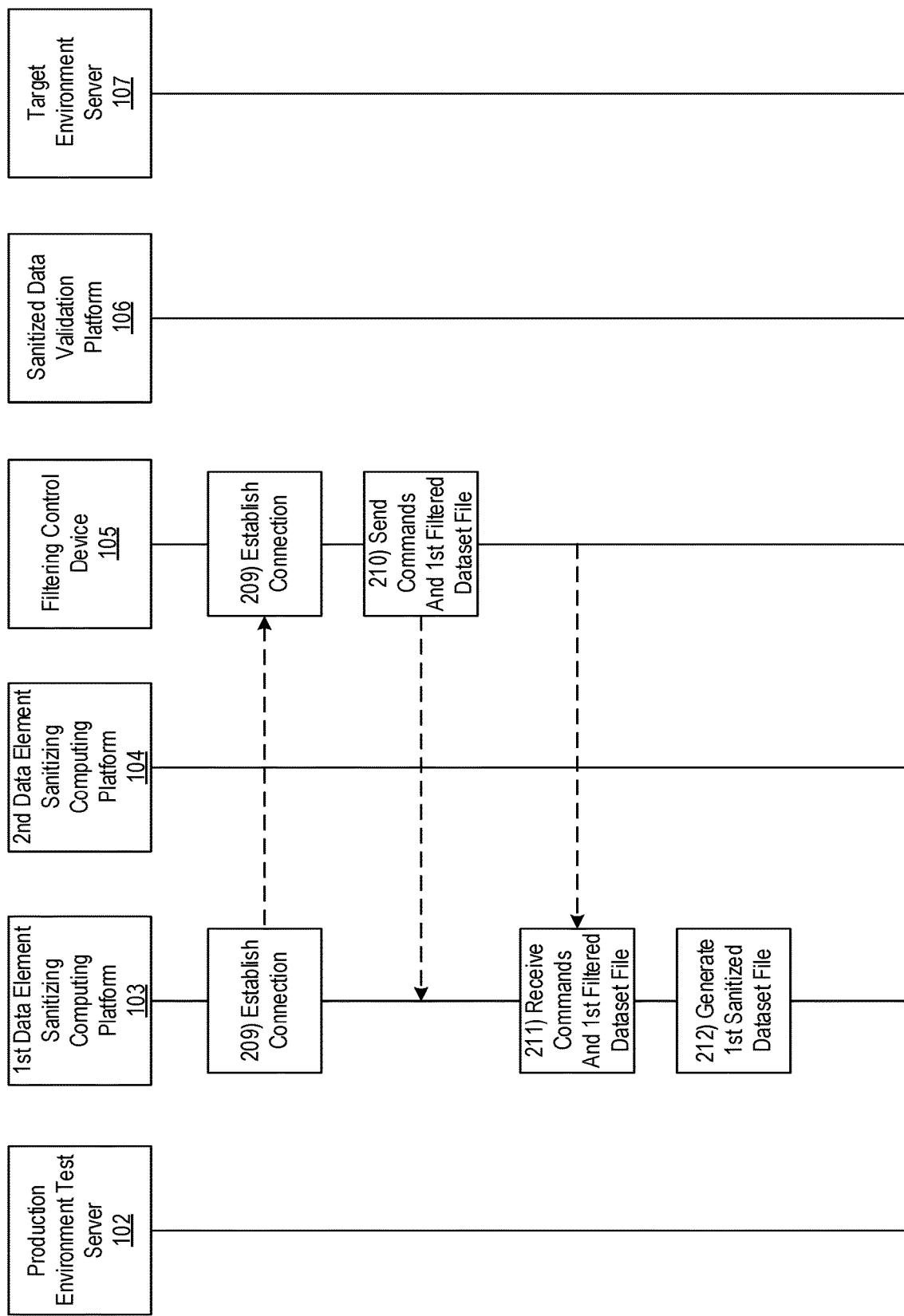

Referring to FIG. 2C, at step 209, filtering control device 105 may establish a connection with a data element sanitizing computing platform such as first data element sanitizing computing platform 103. For example, the filtering control device 105 may establish a second wireless data connection to the first data element sanitizing computing platform 103 to link the filtering control device 105 to the first data element sanitizing computing platform 103.

At step 210, filtering control device 105 may send the one or more sanitization commands generated at 208 and the first filtered dataset file generated at step 207 to the first data element sanitizing computing platform 103. For example, the filtering control device 105 may send, via the communication interface 116 and while the second wireless data connection is established, the one or more sanitization commands and the first filtered dataset file. In some examples, the filtering control device 105 may send the one or more sanitization commands corresponding to the first data element sanitizing computing platform 103 and may not send the one or more sanitization commands corresponding to the second data element sanitizing computing platform 104.

At step 211, the first data element sanitizing computing platform 103 may receive the one or more sanitization commands and the first filtered dataset file sent at step 210. For example, the first data element sanitizing computing platform 103 may receive, via the communication interface 113 and while the second wireless data connection is established, the one or more sanitization commands and the first filtered dataset file.

At step 212, first data element sanitizing computing platform 103 may generate a first sanitized dataset file. For example, the first data element sanitizing computing platform 103 may remove the confidential information included in the first sanitized dataset file. To remove the confidential information, the first data element sanitizing computing platform 103 may perform natural language processing and may use named entity recognition and dynamic entity profiles to identify the confidential information. In determining the dynamic entity profiles, the first data element sanitizing computing platform 103 may determine, using one or more machine learning algorithms and one or more machine learning datasets, characteristics corresponding to various named entities (e.g., a character count, a proximity to another data value, and the like). In some examples, the first data element sanitizing computing platform 103 may determine, using the one or more machine learning algorithms and one or more machine learning datasets, a dynamic entity profile corresponding to each of the data values included in the first filtered dataset file. The first data element sanitizing computing platform 103 may be programmed to recognize, based on the dynamic entity profiles, that a customer name is located between date data and location data. Using this information and natural language processing, the first element sanitizing computing platform may identify customer names in the first filtered dataset file and may extract those customer names from the first filtered dataset file. After extracting the confidential information included in the first sanitized dataset file, the first data element sanitizing computing platform 103 may insert non-confidential numbers, letters, and/or other characters into the first filtered dataset file to replace the confidential information. In some examples, the first data element sanitizing computing platform 103 may maintain a database of correlations between the extracted confidential information and the replacement non-confidential information. This may allow the first data element sanitizing computing platform 103 to restore the first sanitized dataset file to the first filtered dataset file (e.g., identify and extract the non-confidential information and add the confidential information back in).

Referring to FIG. 2D, at step 213, the first data element sanitizing computing platform 103 may send the first sanitized dataset file, generated at step 212, to the filtering control device 105. For example, the first data element sanitizing computing platform 103 may send, via the communication interface 113 and while the second wireless data connection is established, the first sanitized dataset file. In some examples, rather than sending the first sanitized dataset file to the filtering control device 105, the first data element sanitizing computing platform 103 may send the first sanitized dataset file to sanitized data validation platform 106. This may occur if, for example, the first data element sanitizing computing platform 103 is the only data element sanitizing computing platform involved in sanitizing a particular dataset (e.g., the second data element sanitizing computing platform is not involved in the sanitization process). In some instances, the first data element sanitizing computing platform 103 may send the first sanitized dataset file to target environment server 107. In some instances, the first data element sanitizing computing platform 103 may determine that the first sanitized dataset file should be sent to the second data element sanitizing computing platform 104 to extract additional confidential information. In these instances, the first data element sanitizing computing platform 103 may send the first sanitized dataset file to the second data element sanitizing computing platform 104.

At step 214, the first data element sanitizing computing platform 103 may determine whether the dynamic entity profiles should be updated. For example, the first data element sanitizing computing platform 103 may determine whether any new characteristics were determined using natural language processing to perform name entity recognition. For example, the first data element sanitizing computing platform 103 may determine that rather than listing only the customer name, a prefix is now used (Mr., Mrs., Ms., and the like). Based on this determination, the first data element sanitizing computing platform 103 may update the dynamic entity profile corresponding to customer name. This may improve future efficiency and minimize future errors in attempting to identify customer names.

At step 215, the filtering control device 105 may receive the first sanitized dataset file. For example, the filtering control device 105 may receive, via the communication interface 116 and while the second wireless data connection is established, the first sanitized dataset file.

At step 216, filtering control device 105 may establish a connection with a data element sanitizing computing platform such as second data element sanitizing computing platform 104. For example, the filtering control device 105 may establish a third wireless data connection to the second data element sanitizing computing platform 104 to link the filtering control device 105 to the second data element sanitizing computing platform 104. Actions performed at step 216 may be similar to those described above with regard to step 209.

Referring to FIG. 2E, at step 217, filtering control device 105 may send the one or more sanitization commands generated at 208 and the second filtered dataset file generated at step 216 to the second data element sanitizing computing platform 104. For example, the filtering control device 105 may send, via the communication interface 116 and while the third wireless data connection is established, the one or more sanitization commands and the second filtered dataset file. In some examples, the filtering control device 105 may send the one or more sanitization commands corresponding to the second data element sanitizing computing platform 104 and may not send the one or more sanitization commands corresponding to the first data element sanitizing computing platform 103. Actions performed at step 217 may be similar to those described above with regard to step 210.

At step 218, the second data element sanitizing computing platform 104 may receive the one or more sanitization commands and the second filtered dataset file sent at step 217. For example, the second data element sanitizing computing platform 104 may receive, while the third wireless data connection is established, the one or more sanitization commands and the second filtered dataset file. Actions performed at step 218 may be similar to those described above with regard to step 211.

At step 219, second data element sanitizing computing platform 104 may generate a second sanitized dataset file. For example, the second data element sanitizing computing platform 104 may remove the confidential information included in the second sanitized dataset file. To remove the confidential information, the second data element sanitizing computing platform 104 may perform natural language processing and may use named entity recognition and dynamic entity profiles to identify the confidential information. In determining the dynamic entity profiles, the second data element sanitizing computing platform 104 may determine, using one or more machine learning algorithms and one or more machine learning datasets, characteristics corresponding to various named entities (e.g., a character count, a proximity to another data value, and the like). In some examples, the second data element sanitizing computing platform 104 may determine, using the one or more machine learning algorithms and one or more machine learning datasets, a dynamic entity profile corresponding to each of the data values included in the second filtered dataset file. For example, the second data element sanitizing computing platform 104 may be programmed to recognize, based on the dynamic entity profiles, that an account number is eleven digits and is located between location data and account type data. The second data element sanitizing computing platform 104 may also know, based on the dynamic entity profiles, identification information related to the contact information (e.g., a phone number is ten digits and contains dashes after the third and sixth character). Using this information and natural language processing, the second element sanitizing computing platform 104 may identify account numbers and contact information in the second filtered dataset file and may extract those account numbers and contact information from the second filtered dataset file. After extracting the confidential information included in the second sanitized dataset file, the second data element sanitizing computing platform 104 may insert non-confidential numbers, letters, and/or other characters into the second filtered dataset file to replace the confidential information. In some examples, the second data element sanitizing computing platform 104 may maintain a database of correlations between the extracted confidential information and the replacement non-confidential information. This may allow the second data element sanitizing computing platform 104 to restore the second sanitized dataset file to the second filtered dataset file (e.g., identify and extract the non-confidential information and add the confidential information back in). Actions performed at step 219 may be similar to those described above with regard to step 212.

At step 220, the second data element sanitizing computing platform 104 may send the second sanitized dataset file, generated at step 219, to the filtering control device 105. For example, the second data element sanitizing computing platform 104 may send, while the third wireless data connection is established, the second sanitized dataset file. In some instances, the second data element sanitizing computing platform 104 may send the second sanitized dataset file to target environment server 107. Actions performed at step 220 may be similar to those described above with regard to step 213.

Referring to FIG. 2F, at step 221, the second data element sanitizing computing platform 104 may determine whether the dynamic entity profiles should be updated. For example, the second data element sanitizing computing platform 104 may determine whether any new dynamic entity profile characteristics were determined using natural language processing to perform named entity recognition. For example, the second data element sanitizing computing platform 104 may determine that rather than eleven digits, account numbers are now up to twelve digits. Based on this determination, the second data element sanitizing computing platform 104 may update the dynamic entity profile corresponding to account numbers. This may improve future efficiency and minimize future errors in attempting to identify account numbers. Actions performed at step 221 may be similar to those described above with regard to step 214.

At step 222, the filtering control device 105 may receive the second sanitized dataset file. For example, the filtering control device 105 may receive, via the communication interface 116 and while the third wireless data connection is established, the second sanitized dataset file. Actions performed at step 222 may be similar to those described above with regard to step 215.

In some examples, steps 216-222 may be performed after completion of steps 209-215. In other examples, steps 216-222 may be performed simultaneously with steps 209-215.

At step 223, filtering control device 105 may generate a combined sanitized dataset file. For example, after receiving the first sanitized dataset file and the second sanitized dataset file, the filtering control device 105 may combine both files to generate the combined sanitized dataset file which may include all of the non-confidential information included in the dataset file, received at step 205, and may not include confidential information (e.g., the combined sanitized dataset file may be a version of the dataset file that is stripped of all confidential information). At step 224, the filtering control device 105 may generate one or more validation commands directing the sanitized data validation platform 106 to validate the combined sanitized dataset file.

Referring to FIG. 2G, at step 225, filtering control device 105 may establish a connection to sanitized data validation platform 106. For example, the filtering control device 105 may establish a fourth wireless data connection to sanitized data validation platform 106 to link the filtering control device 105 to the sanitized data validation platform 106.

At step 226, the filtering control device 105 may send, to the sanitized data validation platform 106, the one or more validation commands generated at step 224 and the combined sanitized dataset file generated at step 223. For example, the filtering control device 105 may send, while the fourth wireless data connection is established and via the communication interface 116, the one or more validation commands directing the sanitized data validation platform 106 to validate the combined sanitized dataset file.

At step 227, the sanitized data validation platform 106 may receive the one or more validation commands and the combined sanitized dataset file. For example, the sanitized data validation platform 106 may receive, while the fourth wireless data connection is established, the one or more commands directing the sanitized data validation platform 106 to validate the combined sanitized dataset file.

At step 228, after receiving the one or more validation commands and the combined sanitized dataset file, the sanitized data validation platform 106 may validate the combined sanitized dataset file. For example, the data validation platform 106 may determine that each named entity included in the dataset file is included in the combined sanitized dataset file. For example, if the dataset file included a customer name, the sanitized data validation platform 106 may determine whether the combined sanitized dataset file included the customer name. Similarly, the sanitized data validation platform 106 may determine whether a character count of the combined sanitized dataset file corresponds to a character count of the dataset file. In some examples, the sanitized data validation platform 106 may determine whether an order of the named entities in the combined sanitized dataset file corresponds to the order of the named entities in the dataset file. In some examples, the sanitized data validation platform 106 may confirm that the combined sanitized dataset file does not include confidential information. If the sanitized data validation platform 106 determines that the combined sanitized dataset file is validated, it may proceed to step 229. If the sanitized data validation platform 106 determines that the combined sanitized dataset file is not validated, it may return to step 207 to restart the process of generating the combined sanitized dataset file.

Figure 2H:
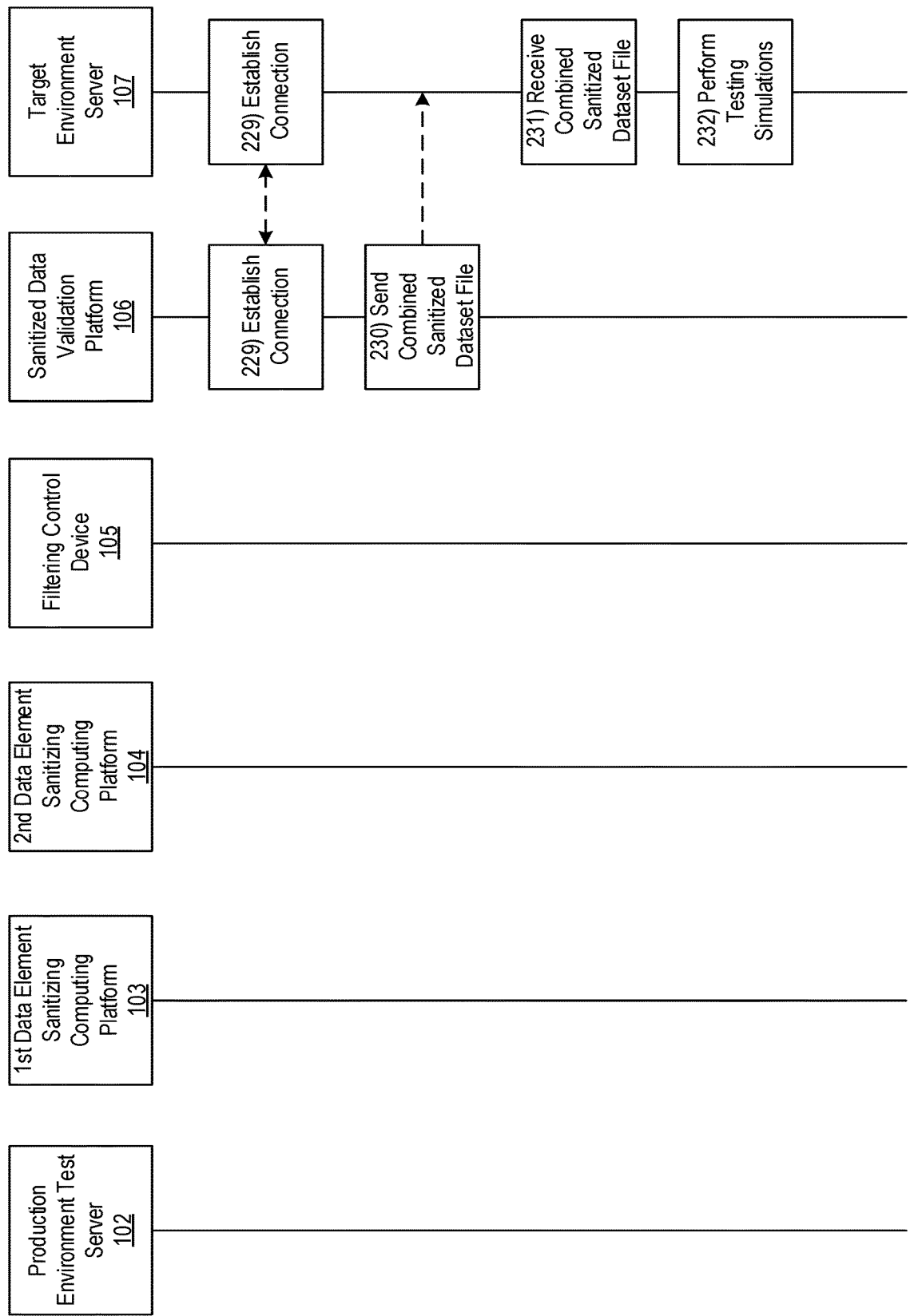

Referring to FIG. 2H, at step 229, the sanitized data validation platform 106 may establish a connection with target environment server 107. For example, the sanitized data validation platform 106 may establish a fifth wireless data connection to the target environment server 107 to link the sanitized data validation platform 106 to the target environment server 107.

At step 230, after validating the combined sanitized data file, the sanitized data validation platform 106 may send the combined sanitized dataset file to the target environment server. For example, the sanitized data validation platform 106 may send, while the fifth wireless data connection is established, the combined sanitized dataset file.

At step 231, the target environment server 107 may receive the combined sanitized dataset file sent at step 230. For example, the target environment server 107 may receive, while the fifth wireless data connection is established, the combined sanitized dataset file.

At step 232, the target environment host server 107 may perform testing simulations. For example, using the combined sanitized dataset file, the target environment host server 107 may run simulations of an application update. In some examples, the target environment host server 107 may run simulations of the application update prior to running the application on the production environment test server 102. In some examples, in performing the testing simulations, the target environment host server 107 may cause display of the combined sanitized dataset file. In causing display of the combined sanitized dataset file, the target environment host server 107 may cause display of a graphical user interface similar to graphical user interface 405, which is illustrated in FIG. 4. As seen in FIG. 4, graphical user interface 405 may not include confidential data. For example, rather than causing display of a customer name, a location, and an account number, the graphical user interface 405 may cause display of alpha-numeric combinations that correspond to non-confidential data. Graphical user interface 305 may also cause display of previously displayed non-confidential information that was not extracted during the sanitization process described herein. In some instances, graphical user interface 305 may also display other non-confidential information not shown in FIG. 3 or described above.

Figure 2I:
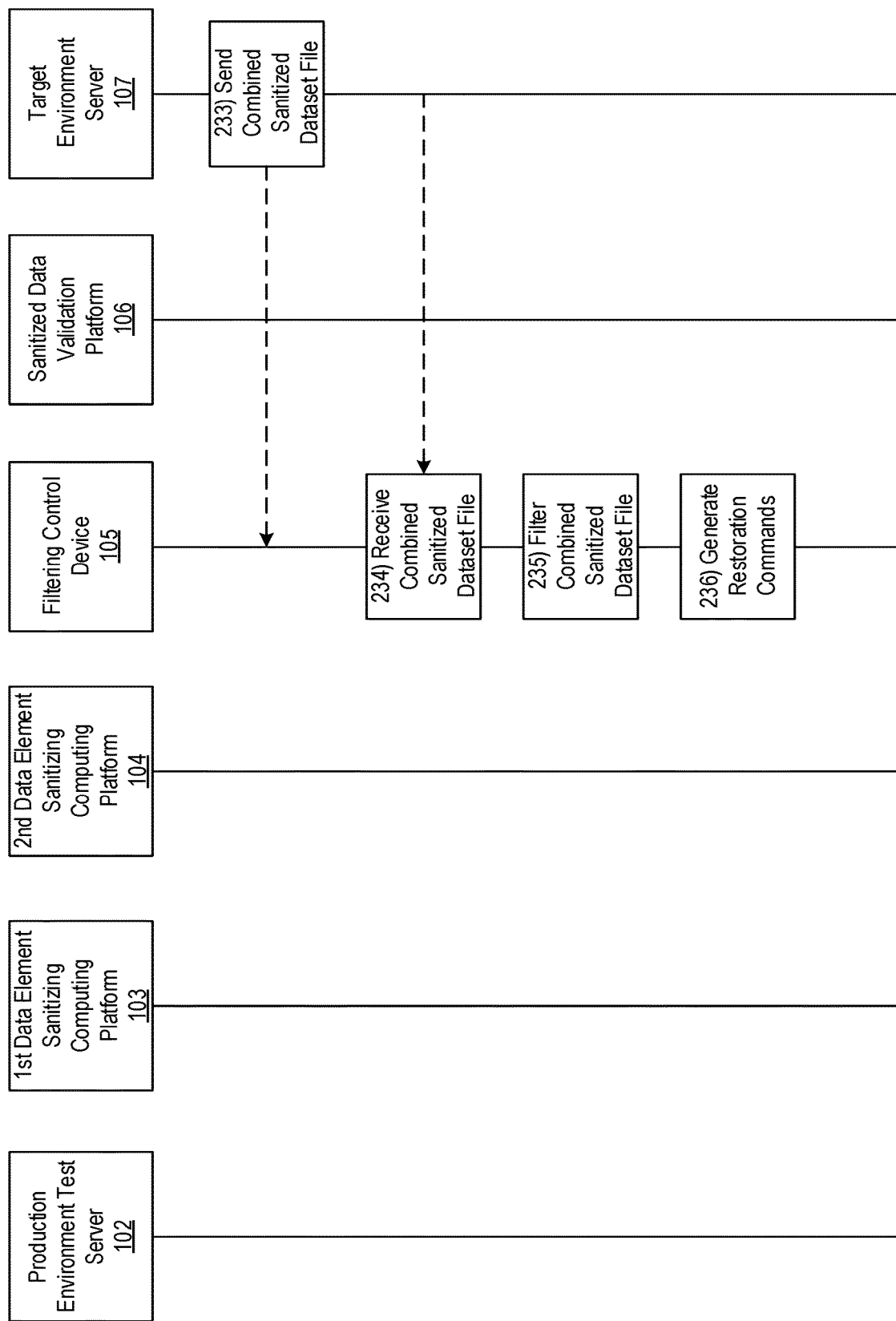

Referring to FIG. 2I, at step 233, once testing at step 232 is complete, the target environment server 107 may send the combined sanitized dataset file to the filtering control device 105. For example, the target environment server 107 may establish a sixth wireless data connection with the filtering control device 105. The target environment server 107 may then send, while the sixth wireless data connection is established, the combined sanitized dataset file.

At step 234, filtering control device 105 may receive the combined sanitized dataset file sent at step 233. For example, the filtering control device 105 may receive, while the sixth wireless data connection is established, via the communication interface 116, and from the target environment server 107, the combined sanitized dataset file.

At step 235, filtering control device 105 may filter the combined sanitized dataset file received at step 234. For example, the filtering control device 105 may use the sanitization matrix described at step 206 to filter the combined sanitized dataset file into a first filtered sanitized dataset file (e.g., a sanitized version of the first filtered dataset file) and a second filtered sanitized dataset file (e.g., a sanitized version of the second filtered dataset file). Actions performed at step 235 may be similar to those described above with regard to step 207.

At step 236, the filtering control device 105 may generate one or more restoration commands directing one or more data element sanitizing computing platforms (such as first data element sanitizing computing platform 103 and second data element sanitizing computing platform 104) to restore the first and second filtered datasets respectively.

Referring to FIG. 2J, at step 237, the filtering control device 105 may send the one or more restoration commands, generated at step 236, and the first filtered sanitized dataset file, generated at step 235, to the first data element sanitizing computing platform 103. For example, the filtering control device 105 may send, while the second wireless data connection is established and via the communication interface 116, the restoration commands and the first filtered sanitized dataset file. In some examples, the filtering control device 105 may send the one or more restoration commands corresponding to the first data element sanitizing computing platform 103 and may not send the one or more restoration commands corresponding to the second data element sanitizing computing platform 104.

At step 238, the first data element sanitizing computing platform 103 may receive the one or more restoration commands and the first filtered sanitized dataset file, sent at step 237. For example, the first data element sanitizing computing platform 103 may receive, while the second wireless data connection is established and via the communication interface 113, the one or more restoration commands and the first filtered sanitized dataset file.

At step 239, the first data element sanitizing computing platform 103 may restore the first filtered dataset file. For example, the first data element sanitizing computing platform 103 may use natural language processing to identify the replacement characters used at step 212 to sanitize the first filtered dataset file. In addition, the first data element sanitizing computing platform 103 may use the database of correlations between the extracted confidential information and the replacement non-confidential information to restore the first sanitized dataset file to the first filtered dataset file (e.g., identify and extract the non-confidential information and add the confidential information back in). As an example, the first data element sanitizing computing platform 103 may identify the replacement characters added at step 212, extract these replacement characters, and add the confidential information (e.g., customer name and the like.).

At step 240, after restoring the first filtered dataset file at step 239, the first data element sanitizing computing platform 103 may send the first filtered dataset file to the filtering control device 105. For example, the first data element sanitizing computing platform 103 may send, while the second wireless data connection is established, the first filtered dataset file. In some examples, rather than sending the first filtered dataset file to the filtering control device 105, the first data element sanitizing computing platform may send the first filtered dataset file to the production environment test server 102.

Referring to FIG. 2K, at step 241, the filtering control device 105 may receive the first filtered dataset file from the first data element sanitizing computing platform 103. For example, the filtering control device 105 may receive the first filtered dataset file while the second wireless data connection is established and via the communication interface 116.

At step 242, the filtering control device 105 may send the one or more restoration commands, generated at step 236, and the second filtered sanitized dataset file, generated at step 235, to the second data element sanitizing computing platform 104. For example, the filtering control device 105 may send, while the third wireless data connection is established and via the communication interface 116, the restoration commands and the second filtered sanitized dataset file. In some examples, the filtering control device 105 may send the one or more restoration commands corresponding to the second data element sanitizing computing platform 104 and may not send the one or more restoration commands corresponding to the first data element sanitizing computing platform 103.

At step 243, the second data element sanitizing computing platform 104 may receive the one or more restoration commands and the second filtered sanitized dataset file, sent at step 237. For example, the second data element sanitizing computing platform 104 may receive, while the third wireless data connection is established, the one or more restoration commands and the second filtered sanitized dataset file.

At step 244, the second data element sanitizing computing platform 104 may restore the second filtered dataset file. For example, the second data element sanitizing computing platform 104 may use natural language processing to identify the replacement characters used at step 219 to sanitize the second filtered dataset file. In addition, the second data element sanitizing computing platform 104 may use the database of correlations between the extracted confidential information and the replacement non-confidential information to restore the second sanitized dataset file to the second filtered dataset file (e.g., identify and extract the non-confidential information and add the confidential information back in). As an example, the second data element sanitizing computing platform 104 may identify the replacement characters added at step 219, extract these replacement characters, and add the confidential information (e.g., account number, contact information, and the like.).

Referring to FIG. 2L, at step 245, after restoring the second filtered dataset file at step 244, the second data element sanitizing computing platform 104 may send the second filtered dataset file to the filtering control device 105. For example, the second data element sanitizing computing platform 104 may send, while the third wireless data connection is established, the second filtered dataset file.

At step 246, the filtering control device 105 may receive the second filtered dataset file from the second data element sanitizing computing platform 104. For example, the filtering control device 105 may receive the second filtered dataset file while the third wireless data connection is established and via the communication interface 116.

At step 247, after receiving the first filtered dataset file and second filtered dataset files respectively, the filtering control device 105 may restore the dataset file by combining the first filtered dataset file and the second filtered dataset file. For example, the filtering control device 105 may regenerate the dataset file generated by the production environment test server 102 at step 202. In some examples, the filtering control device 105 may store the dataset file for future use. Additionally, or alternatively, the filtering control device 105 may send the dataset file to other devices and/or computing platforms for further use.

Figure 5:
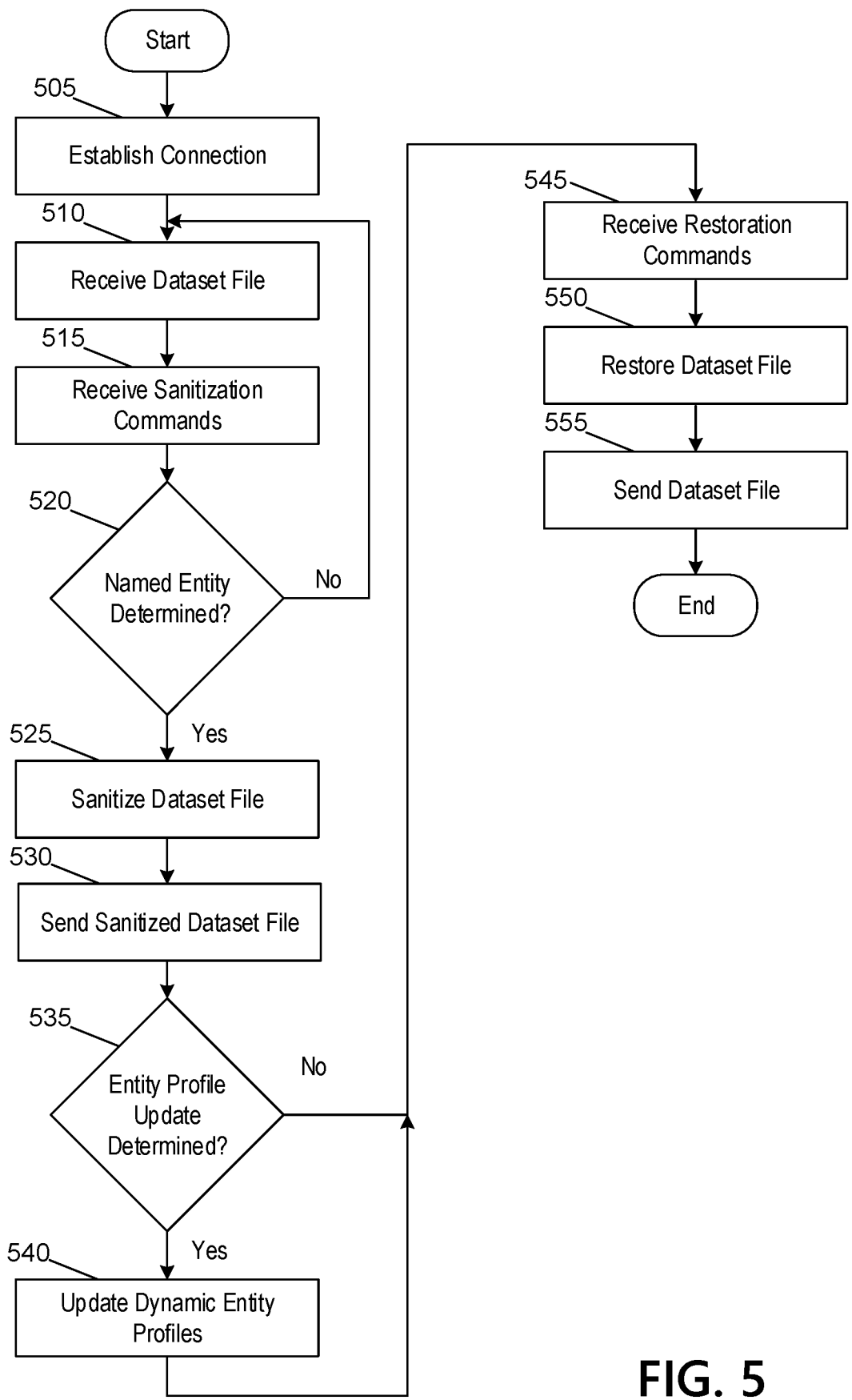
FIGS. 5 and 6 depict illustrative methods for deploying an enhanced processing system that utilizes improved dataset filtering and sanitization techniques in accordance with one or more example embodiments.

FIG. 5 depicts an illustrative method for deploying a data element sanitizing computing platform that uses improved named entity identification techniques in accordance with one or more example embodiments. Referring to FIG. 5, at step 505, a computing platform having at least one processor, a communication interface, and memory may establish a connection with a filtering control device. In some instances, the computing platform may establish a connection with a production environment test server. At step 510, the computing platform may receive a dataset file from the filtering control device or the production environment test server. In some examples, the computing platform may receive a filtered dataset file. At step 515, the computing platform may receive one or more commands directing the computing platform to sanitize the dataset file. At step 520, in response to the sanitization commands received at step 515, the computing platform may determine whether the dataset file contains a named entity corresponding to confidential information. For example, the computing platform may determine whether the dataset file contains a named entity corresponding to confidential information using natural language processing. If the computing platform determines that the dataset file does not contain a named entity corresponding to confidential information, the computing platform may return to step 510 and wait for another dataset file. If the computing platform determines that the dataset file does contain a named entity corresponding to confidential information, the computing platform may proceed to step 525 to sanitize the dataset file.

At step 525, the computing platform may sanitize the dataset file. For example, the computing platform may perform extract the confidential information and replace it with non-confidential information. At step 530, after sanitizing the dataset file, the computing platform may send the sanitized dataset file. In some examples, the computing platform may send the sanitized dataset file to the filtering control device. In other examples, the computing platform may send the sanitized dataset file to a sanitized data validation platform. At step 535, the computing platform may determine whether one or more dynamic entity profiles should be updated based on the named entities determined at step 520. If the computing platform determines that no dynamic entity profiles should be updated, the computing platform may proceed to step 545. If the computing platform determines that a dynamic entity profile should be updated, the computing platform may proceed to step 540.

At step 540, the computing platform may update one or more dynamic entity profiles. At step 545, the computing platform may receive one or more restoration commands directing the computing platform to restore the sanitized dataset file. For example, the computing platform may receive one or more restoration commands directing the computing platform to insert the previously extracted confidential information into the sanitized dataset file. At step 550, in response to the one or more restoration commands directing the computing platform to restore the sanitized dataset file, the computing platform may restore the sanitized dataset file. At step 555, after restoring the sanitized dataset file, the computing platform may send the dataset file to the filtering control device.

Figure 6:
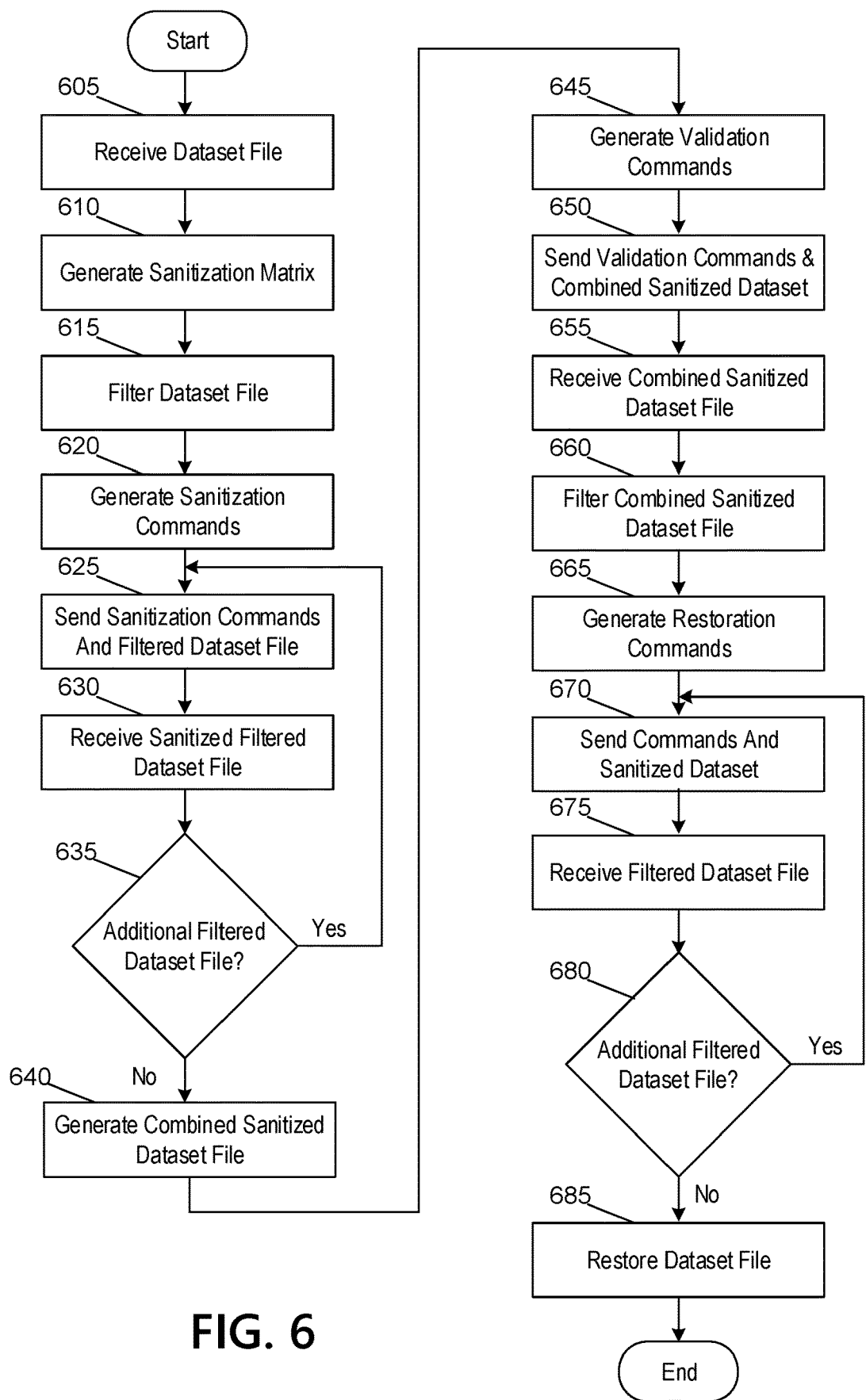

FIG. 6 depicts an illustrative method for deploying a filtering control device that uses improved data sanitization and management techniques in accordance with one or more example embodiments. Referring to FIG. 6, at step 605, a computing platform having at least one processor, a communication interface, and memory may receive a dataset file from a production environment test server. In some examples, in receiving the dataset file, the computing platform may receive confidential information. At step 610, the computing platform may generate a sanitization matrix. In generating the sanitization matrix, the computing platform may generate a list of correlations between named entities and data element sanitizing computing platforms responsible for extracting each of the named entities. At step 615, the computing platform may use the sanitization matrix to filter the dataset file, resulting in filtered dataset files each corresponding to a different data element sanitizing computing platform. At step 620, the computing platform may generate one or more sanitization commands directing one of the data element sanitizing computing platforms to sanitize one of the filtered dataset files. At step 625, after filtering the dataset file and generating the sanitization commands, the computing platform may send the sanitization commands and the filtered dataset files to the one of the data element sanitizing computing platforms. At step 630, the computing platform may receive, from the one of the data element sanitizing computing platforms, a sanitized filtered dataset file. At step 635, the computing platform may determine whether an additional filtered dataset file should be sanitized. If an additional filtered dataset file should be sanitized, the computing platform may return to step 625 to have the additional filtered dataset file sanitized. If the computing platform determines that an additional filtered dataset file should not be sanitized, the computing platform may proceed to step 640.

At step 640, after multiple sanitized filtered dataset files are received, the computing platform may generate a combined sanitized dataset file. At step 645, the computing platform may generate one or more validation commands directing a sanitized data validation platform to validate the combined sanitized dataset file. At step 650, after generating the validation commands, the computing platform may send the combined sanitized dataset file and the validation commands to the sanitized data validation platform. At step 655, once the combined sanitized dataset file has been validated, the computing platform may receive the combined sanitized dataset file. At step 660, the computing platform may filter the combined sanitized dataset file. At step 665, the computing platform may generate one or more restoration commands directing one or more data element sanitizing computing platforms to restore the filtered dataset files. At step 670, the computing platform may send the one or more restoration commands and one of the filtered sanitized dataset files to one of the data element sanitizing computing platforms. At step 675, the computing platform may receive a filtered dataset file from the one of the data element sanitizing computing platforms. At step 680, the computing platform may determine whether an additional sanitized filtered dataset file should be restored. If the computing platform determines that an additional sanitized filtered dataset file should be restored, the computing platform may return to step 670 to send additional sanitization commands. If the computing platform determines that an additional sanitized filtered dataset file should not be restored, the computing platform may proceed to step 685.

At step 685, the computing platform may restore the dataset file from the filtered dataset files. For example, the computing platform may combine the various filtered dataset files.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    at a computing platform comprising at least one processor, a communication interface, and memory:
        identifying, by the at least one processor, confidential information contained in a dataset file using named entity recognition and one or more dynamic entity profiles;
        sanitizing, by the at least one processor, the dataset file by extracting the confidential information from the dataset file and replacing the confidential information with non-confidential information to produce a sanitized dataset file;
        sending, by the at least one processor, to a target environment host server, the sanitized dataset file, wherein sending the sanitized dataset file to the target environment host server causes the target environment host server to use the sanitized dataset file in a testing environment that is prohibited from containing confidential information; and
        updating, by the at least one processor, one or more of the dynamic entity profiles, wherein updating the one or more of the dynamic entity profiles comprises:
            identifying that the confidential information comprises an account number containing a first number of digits,
            identifying that the one or more of the dynamic entity profiles indicates that the account number should contain a second number of digits, and
            modifying, by the at least one processor, based on identification of the account number containing the first number of digits, the one or more of the dynamic entity profiles to indicate that the account number should contain the first number of digits instead of the second number of digits.

2. The method of claim 1, further comprising generating, by the at least one processor, the one or more dynamic entity profiles by:
    determining, for each data value included in the dataset file, at least one of a character count and a proximity to another data value; and
    determining, using at least one machine learning algorithm and at least one machine learning dataset, a dynamic entity profile corresponding to each of the data values included in the dataset file.

3. The method of claim 2, wherein determining the dynamic entity profile corresponding to each of the data values included in the dataset file comprises determining at least one of a customer name, an organization name, a location, an address, a currency, an amount, the account number, a phone number, a SWIFT code, or an email identification.

4. The method of claim 3, further comprising identifying, by the at least one processor, the confidential information contained in the dataset file using named entity recognition and the one or more dynamic entity profiles by:
    determining, using one or more additional machine learning algorithms and one or more additional machine learning datasets, that one or more of the data values included in the dataset file corresponds to a dynamic entity profile corresponding to confidential information.

5. The method of claim 4, further comprising determining, by the at least one processor, that characteristics corresponding to the one or more dynamic entity profiles should be updated.

6. The method of claim 1, further comprising determining, by the at least one processor, that one or more commands directing the computing platform to sanitize the dataset file are directing the computing platform to determine whether the dataset file contains a first type of confidential information and that a second computing platform will subsequently be directed to determine whether the dataset file contains a second type of confidential information.

7. The method of claim 6, wherein sanitizing the dataset file by extracting the confidential information from the dataset file comprises extracting the confidential information from the dataset file that corresponds to the first type of confidential information.

8. The method of claim 1, further comprising:
    determining, by the at least one processor, that the dataset file, received from a filtering control device, should be sent to a second computing platform to extract the confidential information from the dataset file that corresponds to a second type of confidential information;
    establishing, by the at least one processor, with the second computing platform, a wireless data connection; and
    sending, by the at least one processor, via the wireless data connection and to the second computing platform, the dataset file.

9. The method of claim 1, further comprising:
determining, by the at least one processor, after sending the sanitized dataset file to the target environment host server, that the sanitized dataset file should be restored to the dataset file, wherein restoring the dataset file comprises extracting the non-confidential information and replacing the non-confidential information with the confidential information; and
based on determining that the sanitized dataset file should be restored to the dataset file, restoring, by the at least one processor, the sanitized dataset file to the dataset file.

10. One or more non-transitory computer-readable media storing instructions that, when executed by a computing platform comprising at least one processor, a communication interface, and memory, cause the computing platform to:
identify confidential information contained in a dataset file using named entity recognition and one or more dynamic entity profiles;
sanitize the dataset file by extracting the confidential information from the dataset file and replacing the confidential information with non-confidential information to produce a sanitized dataset file;
send, to a target environment host server, the sanitized dataset file, wherein sending the sanitized dataset file to the target environment host server causes the target environment host server to use the sanitized dataset file in a testing environment that is prohibited from containing confidential information; and
update one or more of the dynamic entity profiles, wherein updating the one or more of the dynamic entity profiles comprises:
identifying that the confidential information comprises an account number containing a first number of digits,
identifying that the one or more of the dynamic entity profiles indicates that the account number should contain a second number of digits, and
modifying, based on identification of the account number containing the first number of digits, the one or more of the dynamic entity profiles to indicate that the account number should contain the first number of digits instead of the second number of digits.

11. A computing platform, comprising:
at least one processor;
a communication interface commutatively coupled to the at least one processor; and
memory storing computing-readable instructions that, when executed by the at least one processor, cause the computing platform to:
identify confidential information contained in a dataset file using named entity recognition and one or more dynamic entity profiles;
sanitize the dataset file by extracting the confidential information from the dataset file and replacing the confidential information with non-confidential information to produce a sanitized dataset file;
send, to a target environment host server, the sanitized dataset file, wherein sending the sanitized dataset file to the target environment host server causes the target environment host server to use the sanitized dataset file in a testing environment that is prohibited from containing confidential information; and
update one or more of the dynamic entity profiles, wherein updating the one or more of the dynamic entity profiles comprises:
identifying that the confidential information comprises an account number containing a first number of digits,
identifying that the one or more of the dynamic entity profiles indicates that the account number should contain a second number of digits, and
modifying, based on identification of the account number containing the first number of digits, the one or more of the dynamic entity profiles to indicate that the account number should contain the first number of digits instead of the second number of digits.

12. The computing platform of claim 11, wherein the memory stores additional computer-readable instructions that, when executed by the at least one processor, further cause the computing platform to generate the one or more dynamic entity profiles by:
determining, for each data value included in the dataset file, at least one of a character count and a proximity to another data value; and
determining, using at least one machine learning algorithm and at least one machine learning dataset, a dynamic entity profile corresponding to each of the data values included in the dataset file.

13. The computing platform of claim 12, wherein determining the dynamic entity profile corresponding to each of the data values included in the dataset file comprises determining at least one of a customer name, an organization name, a location, an address, a currency, an amount, the account number, a phone number, a SWIFT code, or an email identification.

14. The computing platform of claim 13, wherein the memory stores additional computer-readable instructions that, when executed by the at least one processor, further cause the computing platform to identify the confidential information contained in the dataset file using named entity recognition and the one or more dynamic entity profiles by:
determining, using one or more additional machine learning algorithms and one or more additional machine learning datasets, that one or more of the data values included in the dataset file corresponds to a dynamic entity profile corresponding to confidential information.

15. The computing platform of claim 14, wherein the memory stores additional computer-readable instructions that, when executed by the at least one processor, further cause the computing platform to:
determine that characteristics corresponding to the one or more of the dynamic entity profiles should be updated.

16. The computing platform of claim 11, wherein the memory stores additional computer-readable instructions that, when executed by the at least one processor, further cause the computing platform to:
determine that one or more commands directing the computing platform to sanitize the dataset file are directing the computing platform to determine whether the dataset file contains a first type of confidential information and that a second computing platform will subsequently be directed to determine whether the dataset file contains a second type of confidential information.

17. The computing platform of claim 16, wherein sanitizing the dataset file by extracting the confidential information from the dataset file comprises extracting the confidential information from the dataset file that corresponds to the first type of confidential information.

18. The computing platform of claim 11, wherein the memory stores additional computer-readable instructions that, when executed by the at least one processor, further cause the computing platform to:
  determine that the dataset file, received from a filtering control device, should be sent to a second computing platform to extract the confidential information from the dataset file that corresponds to a second type of confidential information;
  establish, with the second computing platform, a wireless data connection; and
  send, via the wireless data connection and to the second computing platform, the dataset file.

19. The computing platform of claim 11, wherein the memory stores additional computer-readable instructions that, when executed by the at least one processor, further cause the computing platform to:
  determine, after sending the sanitized dataset file to the target environment host server, that the sanitized dataset file should be restored to the dataset file, wherein restoring the dataset file comprises extracting the non-confidential information and replacing the non-confidential information with the confidential information; and
  based on determining that the sanitized dataset file should be restored to the dataset file, restore the sanitized dataset file to the dataset file.

20. The computing platform of claim 11, wherein receiving the dataset file comprises receiving a file containing confidential information corresponding to one or more users.

* * * * *